(12) United States Patent
Mathur et al.

(10) Patent No.: US 11,706,375 B2
(45) Date of Patent: Jul. 18, 2023

(54) APPARATUS AND SYSTEM FOR VIRTUAL CAMERA CONFIGURATION AND SELECTION

(71) Applicant: Intel Corporation, Santa Clara, CA (US)

(72) Inventors: Durga Raj Mathur, Pleasanton, CA (US); Fai Yeung, Palo Alto, CA (US); Gilson Goncalves de Lima, San Francisco, CA (US); Ling Yao, Portland, OR (US); Ritesh Kale, Cupertino, CA (US); Sankar Jayaram, Cupertino, CA (US); Shaun Carrigan, Cupertino, CA (US); Uma Jayaram, Cupertino, CA (US); Patrick Youngung Shon, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 16/936,351

(22) Filed: Jul. 22, 2020

(65) Prior Publication Data
US 2021/0037168 A1    Feb. 4, 2021

Related U.S. Application Data

(60) Provisional application No. 62/880,633, filed on Jul. 30, 2019.

(51) Int. Cl.
*H04N 5/247* (2006.01)
*H04N 5/222* (2006.01)
(Continued)

(52) U.S. Cl.
CPC ............ *H04N 5/2224* (2013.01); *G06T 7/80* (2017.01); *H04L 65/80* (2013.01);
(Continued)

(58) Field of Classification Search
CPC .. H04N 5/2224; H04N 5/247; H04N 21/2187; H04N 21/84; H04N 21/21805;
(Continued)

(56) References Cited

U.S. PATENT DOCUMENTS

2016/0353090 A1* 12/2016 Esteban ............... H04N 13/243
2018/0295282 A1* 10/2018 Boyce .................... H04N 7/181
(Continued)

*Primary Examiner* — Alazar Tilahun
(74) *Attorney, Agent, or Firm* — Nicholson De Vos Webster & Elliott LLP

(57) ABSTRACT

A system and method for virtual camera configuration and selection. For example, one embodiment of a system comprises: a decode subsystem comprising circuitry to concurrently decode a plurality of video streams captured by cameras at an event to generate decoded video streams from a perspective of corresponding virtual cameras (VCAMs); video evaluation logic to apply at least one video quality metric to determine a quality value for the decoded video streams or a subset thereof, and to rank the decoded video streams based, at least in part, on the quality values associated with the decoded video streams; preview logic to provide the decoded video streams or modified versions thereof to one or more computing devices accessible to one or more video production team members and to further provide the quality values and/or the rank generated by the video quality evaluation logic; stream selection hardware logic to select a subset of the plurality of decoded video streams based on input from the one or more video production team members; and transcoder hardware logic to transcode the subset of the plurality of decoded video streams for live transmission over a public or private network.

24 Claims, 39 Drawing Sheets

(51) Int. Cl.

| | |
|---|---|
| *G06T 7/80* | (2017.01) |
| *H04N 21/84* | (2011.01) |
| *H04L 29/06* | (2006.01) |
| *H04N 21/2187* | (2011.01) |
| *H04L 65/80* | (2022.01) |
| *H04N 23/90* | (2023.01) |

(52) U.S. Cl.
CPC ......... *H04N 21/2187* (2013.01); *H04N 21/84* (2013.01); *H04N 23/90* (2023.01)

(58) Field of Classification Search
CPC ... H04N 5/23238; G06T 7/80; G06T 2200/24; G06T 2200/32; G06T 2207/10016; G06T 2207/20016; G06T 7/73; H04L 65/80; H04L 65/61; H04L 65/70; H04L 65/765; G11B 27/031
See application file for complete search history.

(56) References Cited

U.S. PATENT DOCUMENTS

| | | | |
|---|---|---|---|
| 2019/0289311 A1* | 9/2019 | Xiang | H04N 7/18 |
| 2019/0335166 A1* | 10/2019 | Copley | G06T 15/08 |
| 2019/0364204 A1* | 11/2019 | Wozniak | H04N 19/184 |
| 2019/0364205 A1* | 11/2019 | Wozniak | G06V 20/40 |
| 2020/0107003 A1* | 4/2020 | Phillips | H04N 13/383 |
| 2021/0195163 A1* | 6/2021 | Oh | H04N 13/117 |

\* cited by examiner

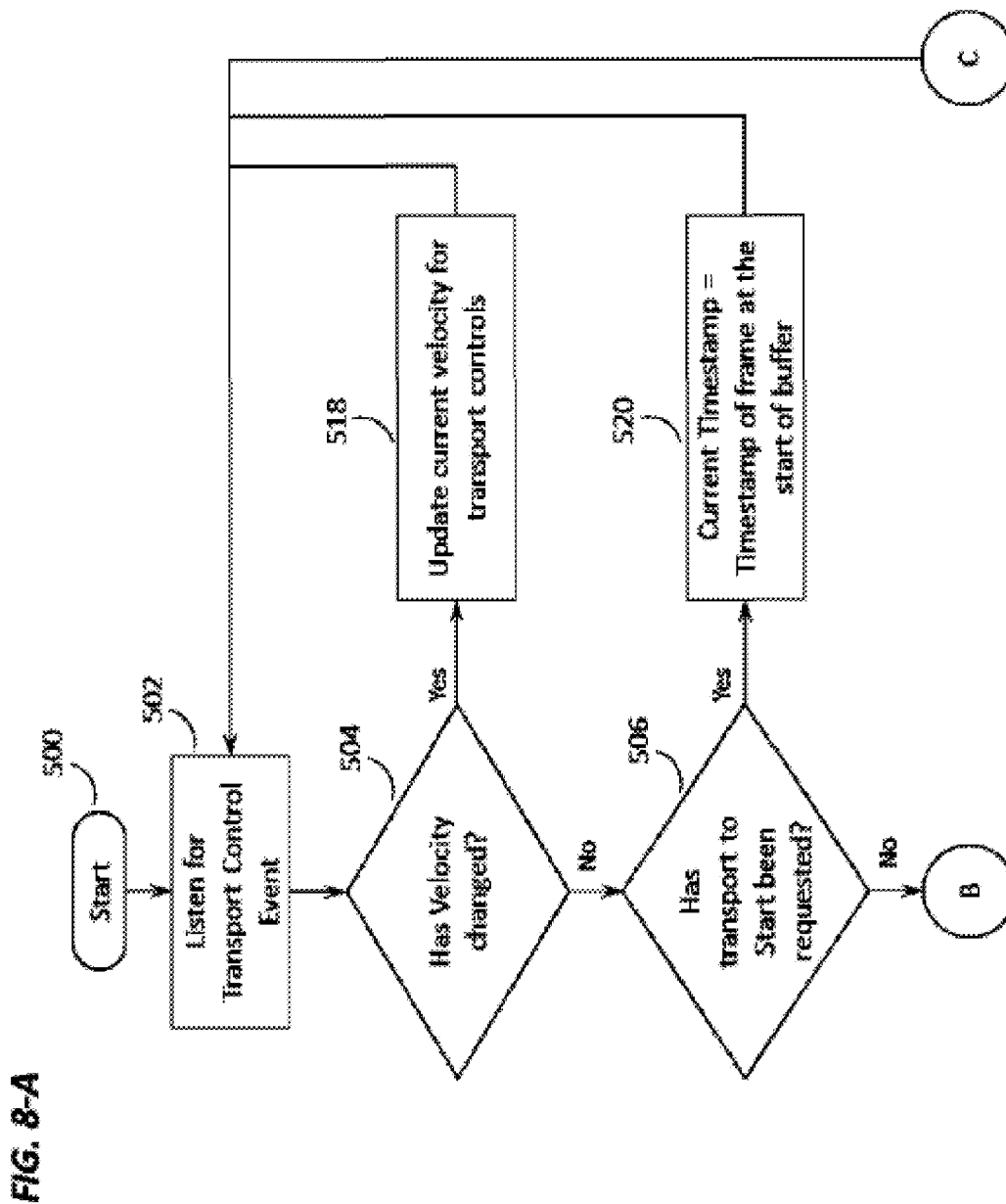
FIG. 8-A

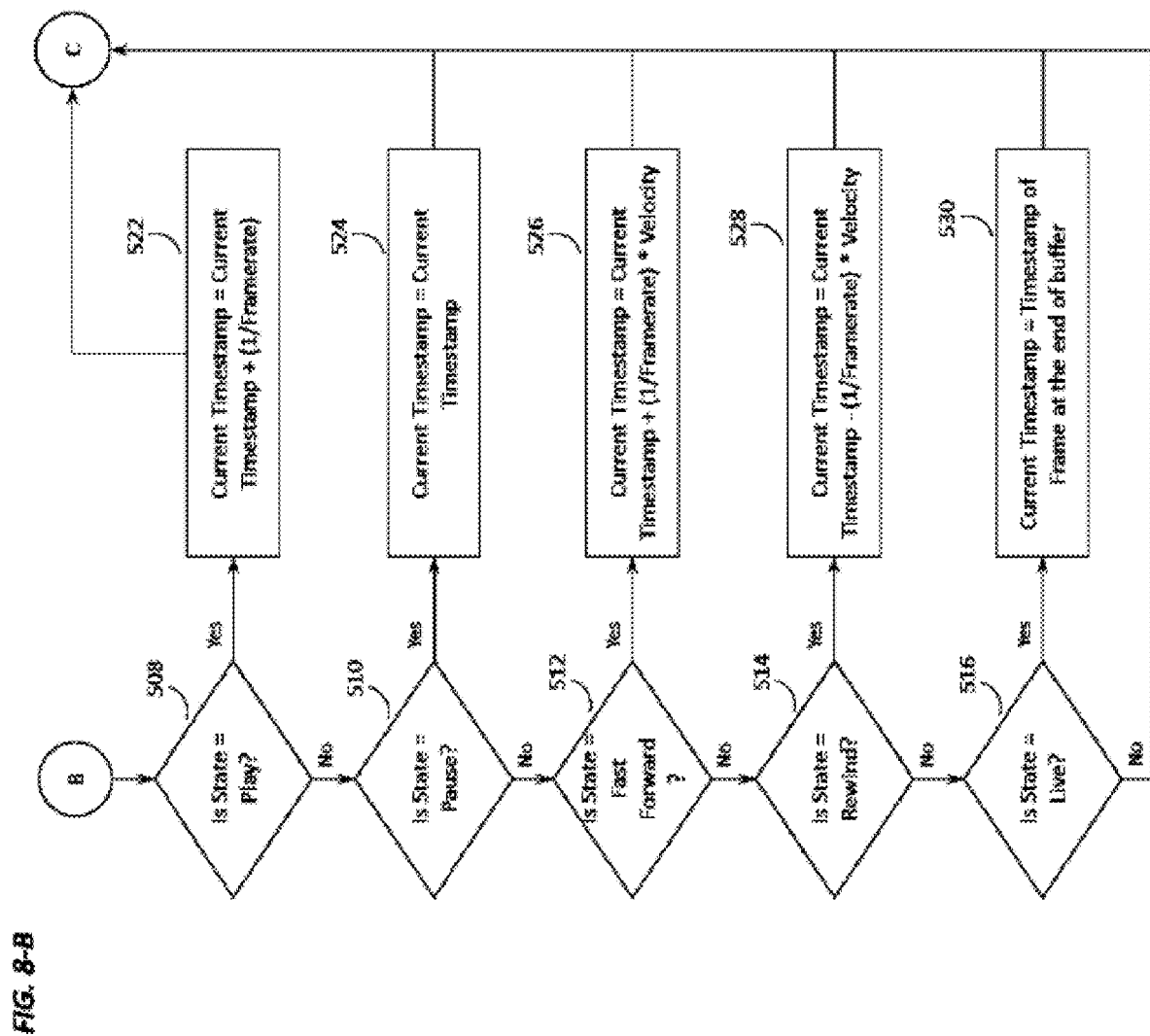
FIG. 8-B

APPARATUS AND SYSTEM FOR VIRTUAL CAMERA CONFIGURATION AND SELECTION

CROSS REFERENCE TO RELATED APPLICATIONS

This application claims the benefit of U.S. Provisional Patent Application Ser. No. 62/880,633, filed Jul. 30, 2019, all of which is herein incorporated by reference.

BACKGROUND

Field of the Invention

This disclosure pertains to videography, image capture, and playback. More particularly, this disclosure relates to systems and methods for user controlled virtual camera for volumetric video.

Description of the Related Art

Techniques are known for using video of a sporting event captured from multiple cameras and using the video to generate a virtual reality (VR) environment. However, these previous solutions are limited to a static view of the event, where the perspective within the VR environment is pre-selected. The way that a user is able to control and view the sports events in those previous solutions is extremely limited and non-interactive.

BRIEF DESCRIPTION OF THE DRAWINGS

A better understanding of the present invention can be obtained from the following detailed description in conjunction with the following drawings, in which:

FIG. 3 is a schematic diagram showing how multiple panoramic video feeds can be received at a client by a receiver and user interface that also has controller functionality built in.

FIGS. 8-A and 8-B are two parts of a flowchart showing how the Transport Control Events are handled by the system and how the time stamp for the frame to be displayed to the user is determined based on the Video Playback State of the viewer application.

DETAILED DESCRIPTION

This disclosure is submitted in furtherance of the constitutional purposes of the U.S. Patent Laws "to promote the progress of science and useful arts" (Article 1, Section 8).

Embodiments of the present invention disclose an apparatus and method for receiving a video stream from a plurality of Panoramic Video Camera Heads or from a local storage disk, storing the video data in a local memory buffer, and viewing regions of interest within any one of the panoramic videos using user interface devices, while controlling the video time, playback speed, and playback direction globally across all panoramic video data in a synchronous manner. According to one construction, multiple Panoramic Video Camera Heads and are synchronized through a time code generator that triggers the image capture across all camera heads synchronously. According to another construction, multiple camera heads are synchronized by one "Master" camera head that sends trigger signals to all the camera heads. Further, according to yet another construction, each camera head is set to "free-run" with a pre-defined frame rate, and the processing computers all capture the latest frame from each of these cameras and timestamp them with a time code from a time code generator.

Various embodiments herein are described with reference to the figures. However, certain embodiments may be practiced without one or more of these specific details, or in combination with other known methods and configurations. In the following description, numerous specific details are set forth, such as specific configurations and methods, etc., in order to provide a thorough understanding of the present disclosure. In other instances, well-known construction techniques and methods have not been described in particular detail in order to not unnecessarily obscure the present disclosure. Reference throughout this specification to "one embodiment" or "an embodiment" means that a particular feature, configuration, composition, or characteristic described in connection with the embodiment is included in at least one embodiment. Thus, the appearances of the phrase "in one embodiment" or "an embodiment" in various places throughout this specification are not necessarily referring to the same embodiment. Furthermore, the particular features, configurations, compositions, or characteristics may be combined in any suitable manner in one or more embodiments.

As used herein, the term "Transport Control" is understood to mean a user interface that allows a viewer to control the video playback, such as choosing between play, pause, rewind and forward, and the speed of rewind or forward.

Figure 1:
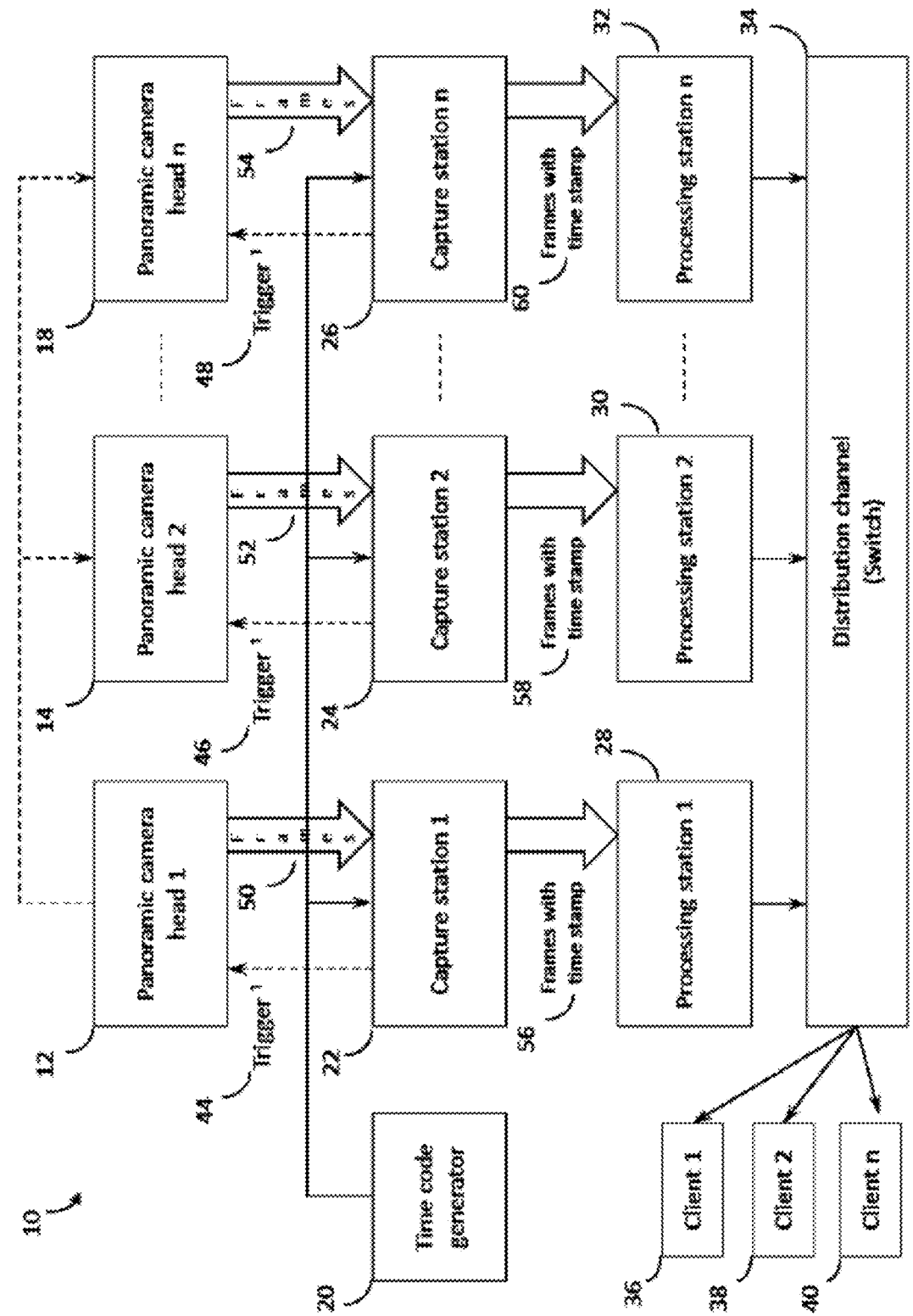
FIG. 1 is a schematic diagram showing unique embodiments of time code synchronization mechanisms that could be used to synchronize frames being captured by capture stations from a plurality of panoramic camera heads before being processed and distributed.

FIG. 1 shows construction of the time code synchronization mechanism 10 extending across a plurality of panoramic camera heads 12, 14 and 18 and capture stations 22, 24 and 25. A time code generator 20 is used to get a consistent time stamp based on the desired rate that frames 50, 52 and 54 need to be captured from the panoramic cameras 12, 14 and 18. The same time code from time code generator 20 is received by each of the Capture Stations 22, 24 and 26, and in one of the embodiments of this mechanism, the time code is used to trigger.sup.1 44, 46 and 48 the panoramic cameras 12, 14 and 18. This is also referred to as a "software trigger" 44, 46 and 48 of the panoramic cameras 12, 14 and 18. The panoramic cameras 12, 14 and 18 capture a frame 50, 52 and 54 when triggered by trigger 44, 46 and 48, respectively, and return the frame 50, 52 and 54 to the corresponding Capture Stations 22, 24 and 26 that generated the trigger 44, 46 and 48. The Capture Stations 22, 24 and 26 attach the time-stamp information from the time code to the frames, forming "frames with time stamps" 56, 58 and 60. Because the time-code is shared between Capture Stations 22, 24 and 26, the frames 56, 58 and 60 generated from each of the Capture Stations 22, 24 and 26 for a given time-code are synchronized, as they have the same timestamp. These frames 56, 58 and 60 are then transmitted to the Processing Station 28, 30 and 32, respectively, where they are compressed for transmission over the network and sent to some Distribution Channel 34. The time-stamp information on the frames 56, 58 and 60 is maintained throughout this processing, compression, and distribution process. The distribution device, or channel (switch) 34 is configured to distribute the processed images or compressed video stream to client processors in clients 36, 38 and 40. Clients 36, 38 and 40 also include memory.

Another embodiment of the time code synchronization mechanism 10 of FIG. 1 involves triggering the panoramic camera heads 12, 14 and 18 using a "hardware sync trigger.sup.2" 42. The hardware trigger 42 is generated at specific time intervals based on the desired frame rate. This rate of hardware triggering has to match the rate of time codes being generated by the time code generator 20. One of the panoramic camera heads 12, 14 and 18 acts as a "Master" and all other panoramic camera heads 12, 14 and 18 act as "Slaves". The "Master" panoramic camera triggers itself and all the "Slave" panoramic cameras synchronously. When a trigger is generated, a frame is captured at the panoramic camera 50, 52 or 54. Once the frame 50, 52 or 54 is captured, an event is invoked at the Capture Station 22, 24 or 26, and this is when the Capture Station 22, 24 or 26 "grabs" the frame from the camera 12, 14 or 18, and associates the time stamp corresponding to the latest time-code received from the time-code generator 20 to the frame 50, 52 or 54.

A third embodiment of the time code synchronization mechanism 10 of FIG. 1 involves letting the panoramic cameras 12, 14 and 18 capture frames in a "free run" mode, where each of the panoramic cameras 12, 14 and 18 trigger as fast as possible. The Capture Station 22, 24 and 26 uses the time code signal to "grab" the latest frame 50, 52 or 54 that was captured by the panoramic camera 12, 14 or 18, and associates the time stamp corresponding to the time-code with the frame.

Figure 2:
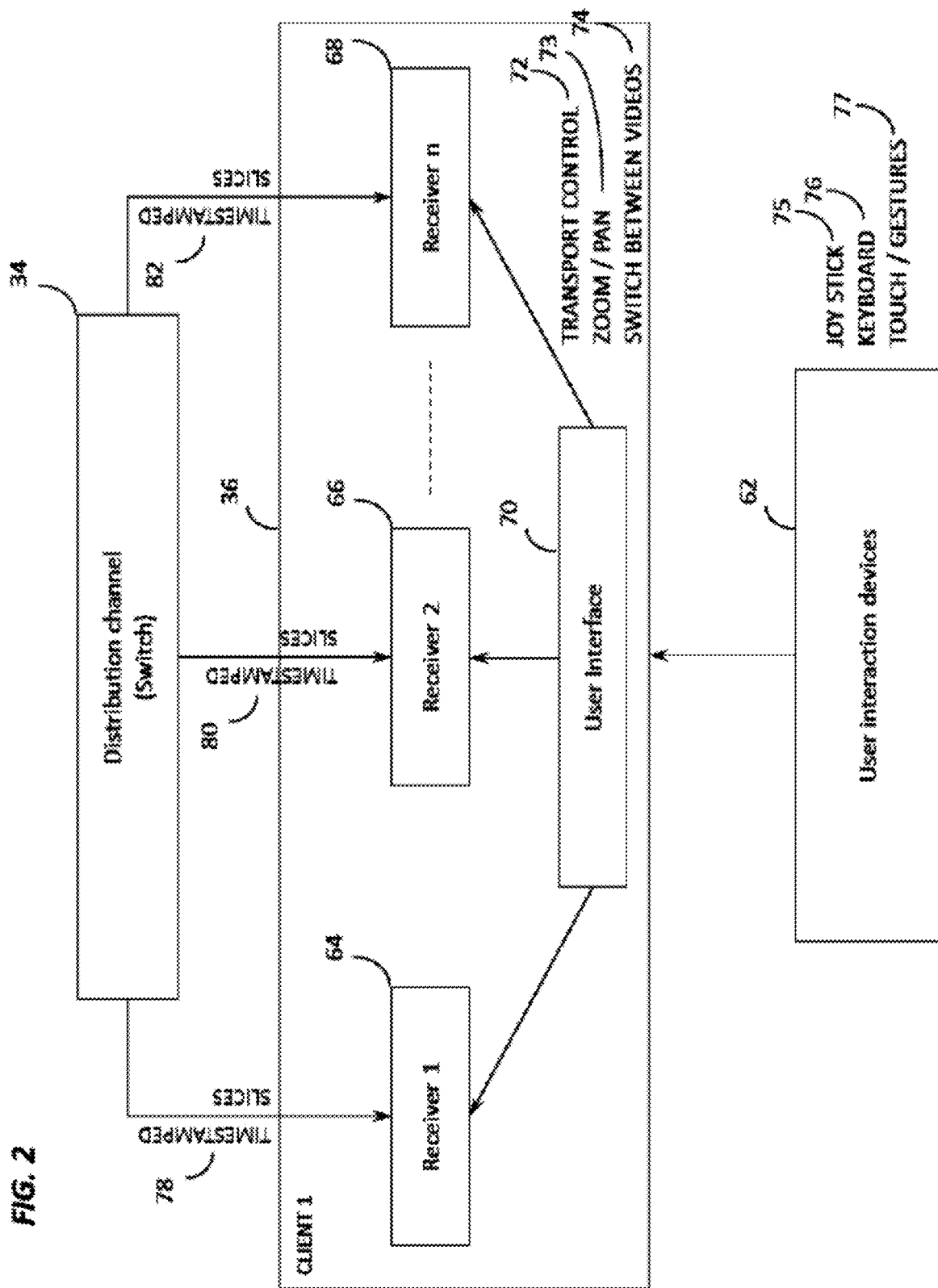
FIG. 2 is a schematic diagram showing how multiple receivers, or receiving modules on a viewer machine would receive time-stamped frames from the panoramic video feeds, and to show the user interface as the intermediate application for managing how the user input requests are handled and how the clients are manipulated to cater to the user request.

FIG. 2 shows multiple receivers 64, 66 and 68 on a client machine 36 receiving time-stamped slices 78, 80 and 82, respectively, from the panoramic video feeds via distribution channel 34. A user interface 70 on the client machine 36 determines which receiver is the active receiver 64, 66 or 68 displayed to the user. User interface 70 also manages the user interaction input from devices 62 like a joystick 75, a keyboard 76, and a touch or gesture based device(s) 77. User interface 70 uses this input to determine which client stream should be the active stream (switch between videos 74), and what section of the panoramic video should be displayed (zoom/tilt/pan 73) to the end-user. Another input from the user-interaction devices is the input related to transport control 72. User interface 70 uses this input and passes it on to all the receivers. This enables all the receivers to perform the same transport control operations to their respective panoramic video streams, and ensures that all the panoramic video streams are synchronized.

Figure 3:
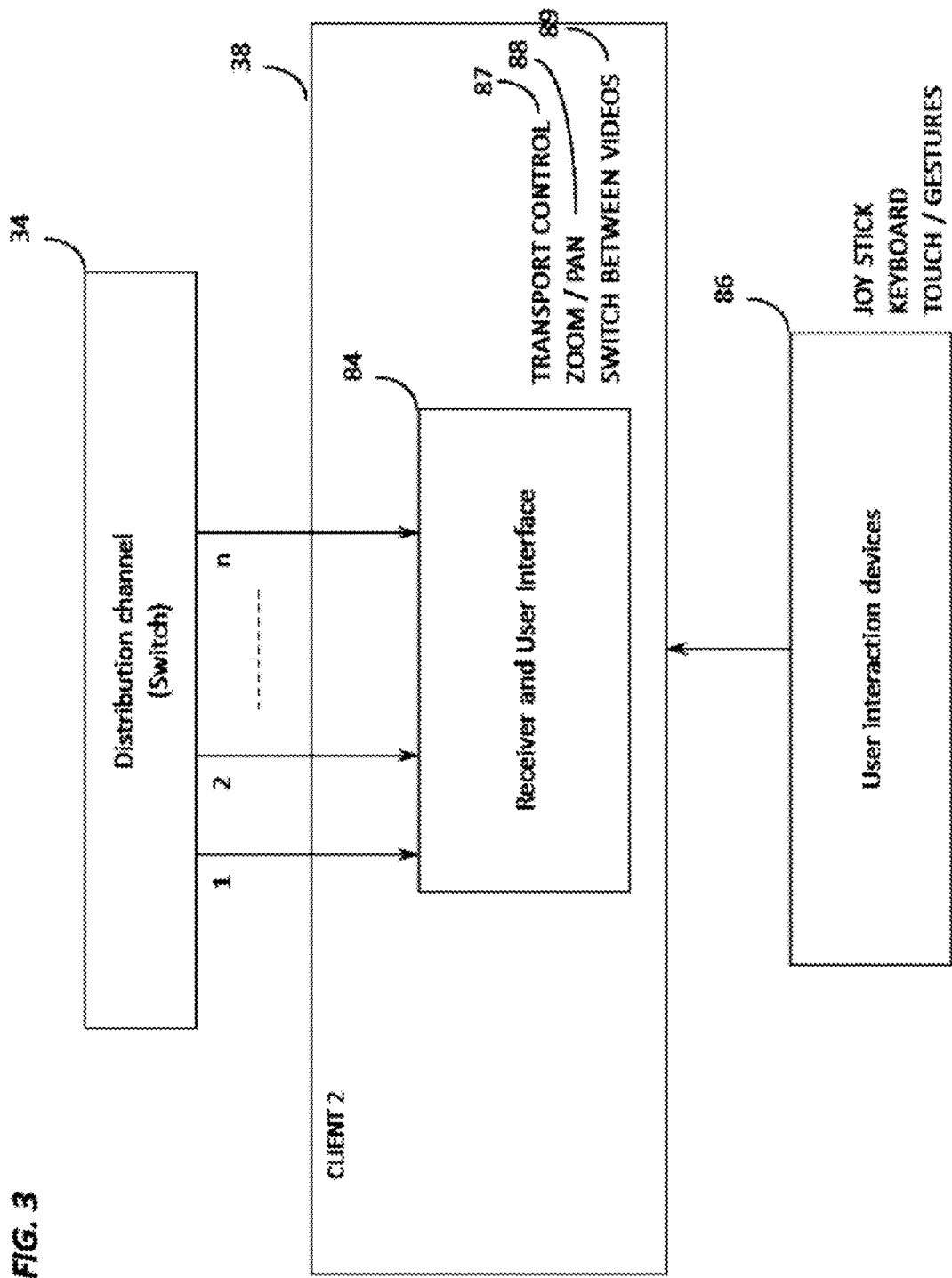

FIG. 3 shows another embodiment of the client application on the viewer machine. In this embodiment, a single application serves as the receiver and user interface 84. The receiver receives time-stamped frames for all the panoramic video streams via distribution channel 34 and manages each of these streams in its own application memory. The receiver also includes processing circuitry. User interface functionality described in FIG. 2 is also integrated in this application. As described in FIG. 2, the user interface manages the input from the user interaction devices 86 and performs the actions for switching between videos 89, what section of the panoramic video should be displayed (zoom/pan/tilt 88) to the end-user, and how to apply the transport control 87 to all the streams in memory.

Figure 4:
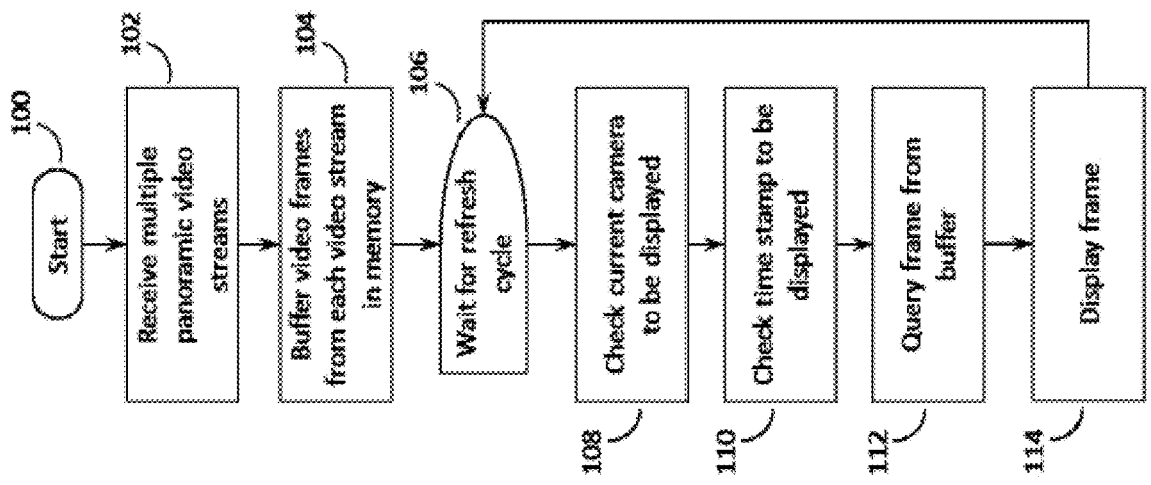
FIG. 4 is a flow chart showing the steps involved in a viewer machine to receive multiple panoramic video streams, to buffer the frames from each feed, and to determine the frame from the buffer to be displayed to the end user based on the camera in view and the time stamp sought by the user.

The following variables are stored with the controller module for receiver and user interface 84 that determine the state of the view that is displayed to the end-user: a. Current Camera to be displayed b. Current Time Stamp of the frame to be displayed c. Current Video Playback State—Possible values are Play, Pause, Fast Forward, Rewind, Live d. Current Viewport—The viewport is determined by the current zoom, pan, and tilt values The user interaction devices 86 could generate the following types of events that are handled by the receiver and user interface 84: a. Camera Changed Event b. Video Playback State Changed Event c. Viewport Changed Event d. Transport Control Event FIG. 4 shows the steps involved in a viewer machine to receive multiple panoramic video streams and determine the frame to be displayed to the end user. The frames from each panoramic video stream that is received by the viewer machine 102 are buffered in memory (Hard disk drive, application memory, or any other form of storage device) 104. Each frame received by the viewer machine has a time-stamp associated with it, which serves as the key to synchronize frames across multiple panoramic streams. Once the frames have started buffering, the viewer application enters a refresh cycle loop starting with a "wait for refresh cycle" 106. The refresh cycle is a periodic set of operations performed by the application at every refresh interval of the display. The viewing application stores the information about the panoramic camera being displayed 108 and the information about the time stamp to be displayed based on the playback state of the application and user inputs related to transport controls. For each refresh cycle, the application checks the current panoramic camera that needs to be displayed, and then checks for the time stamp to be displayed 110. Using these two pieces of information, the appropriate frame to be displayed is sought from the buffer in memory 112. This frame is then passed on to the application for display 114 in that refresh cycle.

Figure 5:
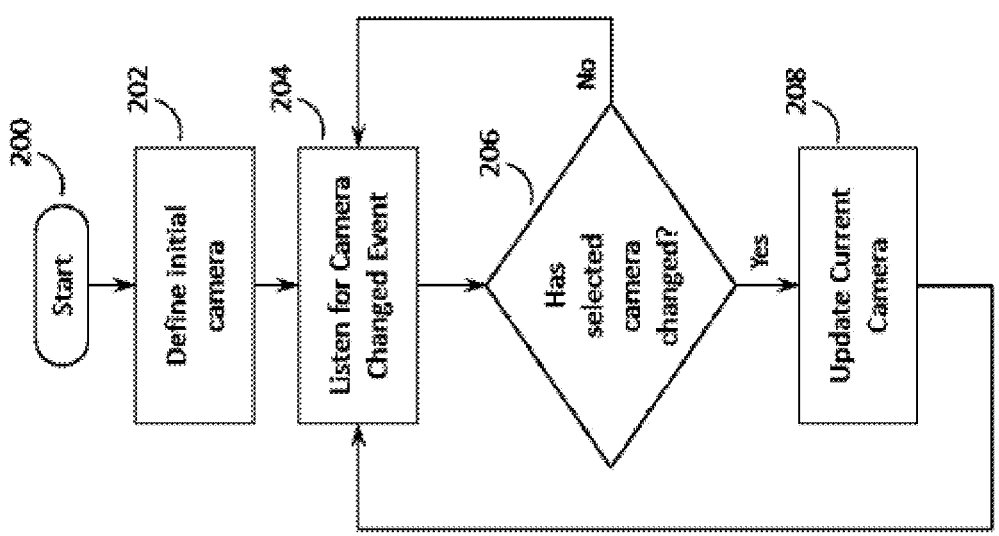
FIG. 5 is a flow chart showing the steps involved in handling a Camera Changed Event triggered by the user.

FIG. 5 shows the steps involved in handling the Camera Changed Event triggered by the user. An initial camera is used, or defined 202 as the default after initiating a start 200. Then the application goes into a 'listen' mode 204 where it is waiting for Camera Changed Events 206 triggered by the user interaction devices. When a request for changing the selected camera is received, the local variable in the application that stores current camera information is updated 208, and the application goes back into the 'listen' mode, waiting for the next Camera Changed Event.

Figure 6:
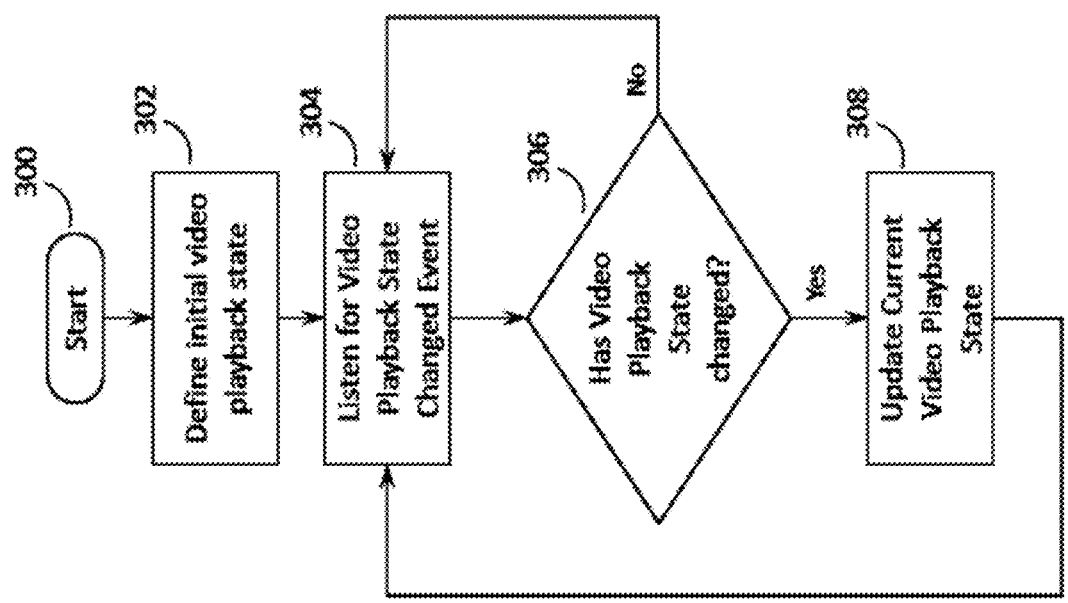
FIG. 6 is a flow chart showing the steps involved in handling a Video Playback State Changed Event triggered by the user.

FIG. 6 shows the steps involved in handling the Video Playback State Changed Event triggered by the user from start 300. An initial video playback state 302 is used as the default to start with. Then the application goes into a 'listen' mode 304 where it is waiting for Video Playback State Changed Events 306 triggered by the user interaction devices. When a request for changing the video playback state is received, the local variable in the application that stores the current video playback state is updated 308, and the application goes back in the 'listen' mode, waiting for the next Video Playback State Changed event.

Figure 7:
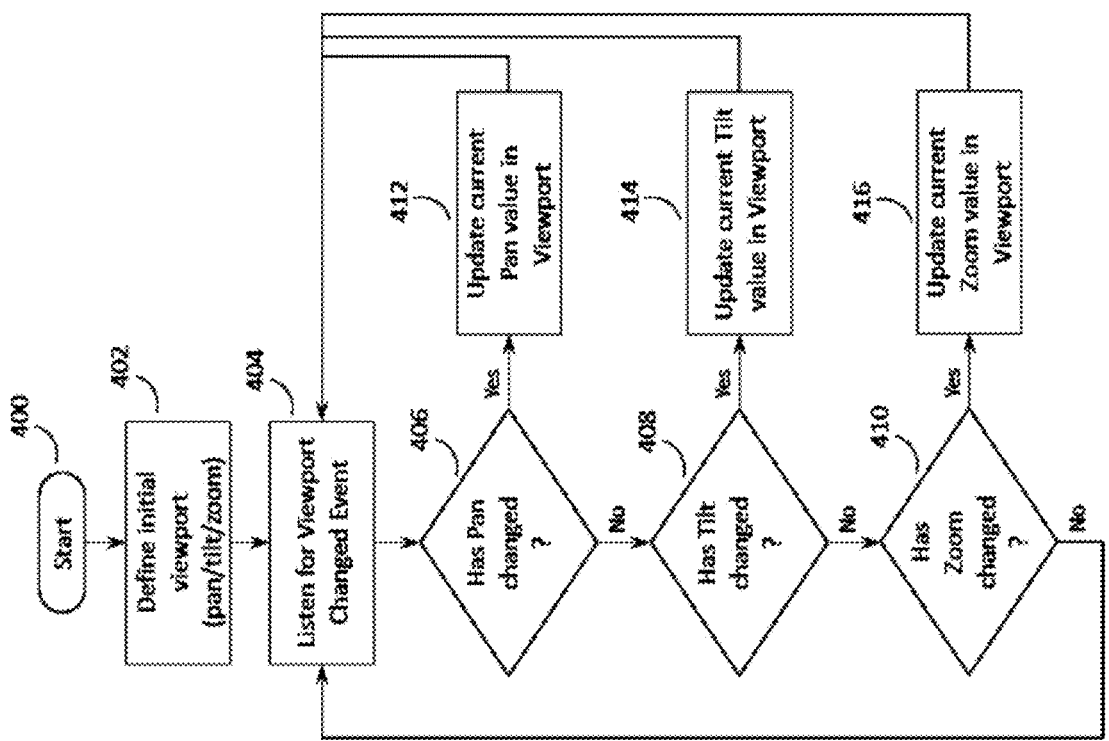
FIG. 7 is a flow chart showing the steps involved in handling a Viewport Changed Event triggered by the user.

FIG. 7 shows the steps involved in handling the Viewport Changed Event triggered by the user from start 400. The viewport could be changed by changing the zoom, tilt, or pan. An initial zoom, tilt, and pan is used as a default 402 to start with. Then the application goes into a 'listen' mode 404 where it is waiting for Viewport Changed Events triggered by the user interaction devices. When a request for changing the viewport is received, the application checks to see if the zoom 410, pan 406, or tilt 408 value has been changes, and updates the local variables 416, 412 and 414, respectively in the application that store the zoom, pan, and tilt. The application then goes back in the 'listen' mode, waiting for the next Viewport Changed Event.

FIGS. 8A and 8B show how the Transport Control Events are handled by the viewing application initiated at start 500. The application is listening for Transport Control Changed Events 502. The application checks to see if the velocity of transport control was changed 504. If the velocity was changed, the value of the velocity stored within the application is updated 518 and the application goes back to listening for Transport Control Changed Events. If velocity has not changed, then the application checks to see if the user has requested to "Transport to Start" 506 so that they view the start of the buffered video stream in memory. If "Transport to Start" was requested, the value of the current timestamp to display is changed to be the same as the timestamp of the frame at the start of the buffer in memory 520, and the application goes back to listening for Transport Control Changed Events. If "Transport to Start" was not requested, then the application determines the current timestamp to be used for display based on playback state that the application is in. If the application is in "Play" state 508, then the current timestamp is incremented to the next timestamp 522. If the application is in the "Pause" state 520, then the current timestamp is not changed 524. If the application is in the "Fast Forward" 512 or "Rewind" state 514, then the current timestamp is incremented 526 or decremented 528 taking the frame rate and velocity of transport into account. If the application is in the "Live" state 516, then the current timestamp is set to the timestamp of the frame at the end of buffered frames in memory 530.

Figure 9:
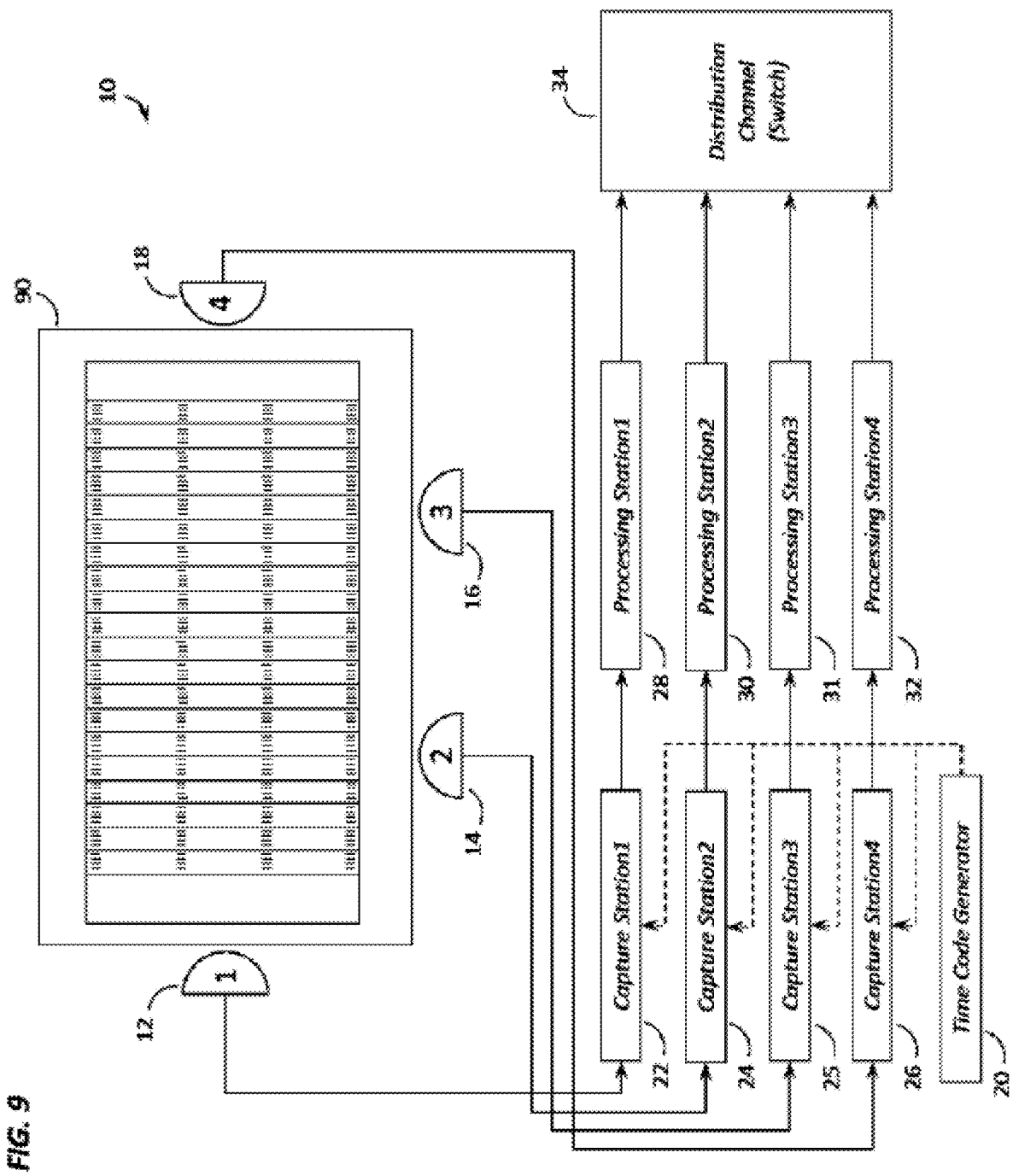
FIG. 9 shows how multiple panoramic cameras are strategically placed an event location and how they are connected to the capture stations, processing stations, and distribution channel.

FIG. 9 shows a football field 90 as the event location where multiple panoramic cameras 12, 14, 16 and 18 are located at strategic locations such that they provide different angles to view a sporting event from and allow one or more end-users to choose the angle that is best suited (for them) for viewing the event at any given point in time. Each of the panoramic video cameras 12, 14,16 and 18 is connected to a capture station 22, 24, 25 and 26, respectively. Each capture station 22, 24, 25 and 26 receives a time-code from a time-code generator, and the time-stamp from the time-code is attached to the frames received from the panoramic video camera. The frames are then transmitted to the processing stations 28, 30, 31 and 32 where they are processed and streamed out to the distribution channel 34. Distribution channel 34 receives the frames and communicates the frames over a network to multiple clients that are connected to the distribution channel.

A panoramic video capture device as used herein comprises multiple sensors placed in a circular array such that a portion of image captured by each sensor overlaps with a portion of image captured by adjacent sensors. The overlapping images from the different sensors are captured synchronously based on a trigger mechanism, and these overlapping images form the basis for creation of a single, seamless panoramic image.

As used herein, a processor is a high-performance server-grade machine housing multiple graphic processing units (GPUs). A GPU is capable of performing large number of operations in parallel. The use of multiple GPUs in the processor allows for highly parallelized computations on multiple image frames being communicated by the panoramic video capture device. Memory can also be resident.

A processor comprises the following modules. First, a capture module is responsible for triggering the panoramic video capture device and retrieving the image frames once the exposure of the frame is complete. In certain embodiments of the capture module, the triggering of the sensors is not performed by this module. There is a separate trigger mechanism for the sensors and the capture module is notified of the event every time a new image frame is available on the panoramic video capture device. When this notification is received by the capture module, it retrieves the image frame from the panoramic video capture device.

As used herein, a processing module is operative to receive the raw frame from the capture module and applies the following filters to the raw frame: Demosaicing filter: In this filter, a full color image is reconstructed using the incomplete color samples from the raw image frames. Coloring filter: The full color image output from the demosaicing filter is then converted to appropriate color space (for example, RGB) for use in downstream modules. Seam blending filter: Colored images output from the coloring filter are used for blending the seam using stitching algorithms on the overlap between adjacent images.

As used herein a splicing module is responsible for using the images output from the processing module, and putting them together with the ends lined up against each other in such that the aggregate of these individual images creates one panoramic image.

Also as used herein, a slicing module takes the seam blended panoramic image, and splits this image into multiple slices. This is done so that each slice of the panoramic image can be distributed over the network in an optimized fashion. This overcomes the existing limitations of certain network protocols that cannot communicate panoramic images above a certain size of the image.

As used herein, a time stamp module listens for the time code from the time code generator. This time stamp is then attached to each slice of the image sections output from the slicing module.

As used herein, a compression module takes the image frame output by the time stamp module and compresses it using certain image compression techniques (JPEG, H.264, etc.) for transmission of over the network.

As used herein, a distribution device is a kind of router or switch that is used for transmitting the compressed frames over the network. Multiple clients could connect to the distribution device and receive the image frames being transmitted. In addition to this, subsequent distribution devices themselves could be connected to a distribution device transmitting the images for relaying the images over a wide network.

As used herein a client process processes the combination of sub-processes and modules on a viewer's machine to receiving image frames from a distribution device, store them in buffer, manage the user input from the user interaction devices, and display the video images to the end-user.

The client process is broken down into the following modules:

A receiving module which connects to the source of the video images via the distribution device, receives the images over the network, and stores them in a buffer on the viewer's machine.

A user interface module is used for managing the user input from the user interaction devices. In one of the implementations of the user interface module, the joystick controller is used for capturing the user input. The user input could be provided using buttons on the joystick or using the multiple thumb pad controls on the joystick. Different buttons are used to track the video playback state change input for play, pause, fast forward, rewind, or live mode A thumb pad control is used to track the viewport change inputs for zoom, pan, tilt of the view Another thumb pad control is used to track the transport control input for jogging forward or back based on the velocity of jog determined by how far the thumb pad control has been pushed.

A display module is used for displaying portion of the panoramic video frames to the user. The portion of the video frame to be displayed is determined based on the inputs from the user interface module. Image frame from the buffer is fetched and based on the other user inputs, the portion of the panoramic image to be displayed is determined. This portion is then displayed to the end-user for viewing.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

Panoramic Broadcast Virtual Reality (VR) Architecture

Figure 10:
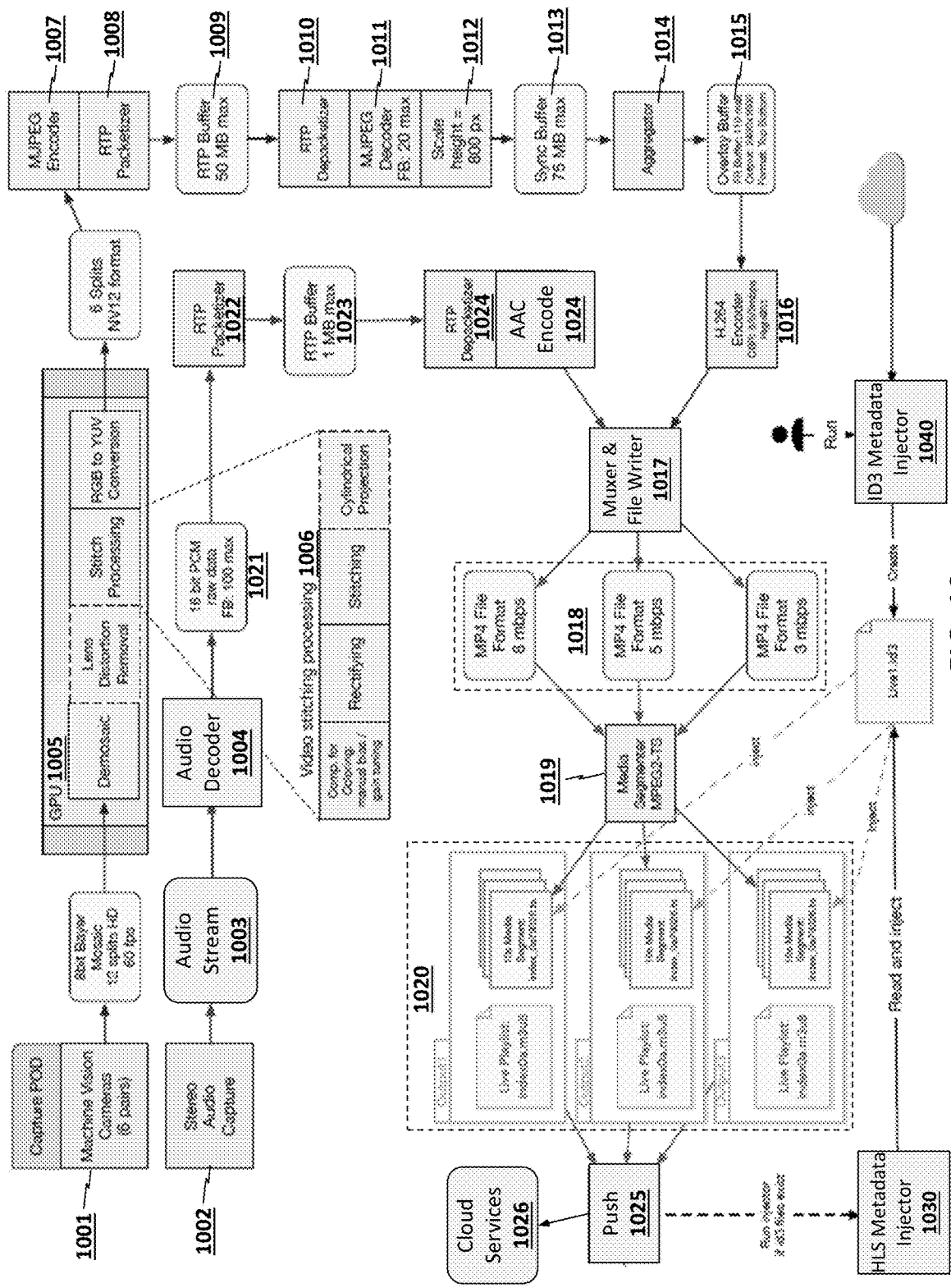
FIG. 10 illustrates one embodiment of an architecture for capturing and streaming real time video of an event.

FIG. 10 illustrates one example of a panoramic broadcast virtual reality (VR) system. As mentioned, in one embodiment, a plurality of stereoscopic cameras 1001 capture video of an event from different perspectives (e.g., a sporting event, musical performance, theatrical performance, etc) and stereo audio capture unit 1002 simultaneously captures and encodes audio 1003 of the event. In one implementation, the six pairs of stereoscopic cameras are integrated on a video capture device 1001 (referred to herein as a capture POD) and any number of such video capture devices 1001 are distributed at different event locations to capture video from different perspectives. As used herein, a stereoscopic camera is typically implemented as two cameras: one to reproduce a left eye perspective and one to reproduce a right eye perspective. As discussed below, however, in certain embodiments (e.g., such as when bandwidth reduction is required) only the left (right) eye video may be captured and the right (left) stream may be reproduced by performing a transformation on the left (right) video stream (i.e., using the coordinate relationship between the left and right eyes of a user as well as the coordinates of the event).

While certain embodiments described herein use six stereoscopic cameras in each device POD, any number of pairs of stereoscopic cameras may be used while still complying with the underlying principles of the invention (e.g., 10 pairs/POD, 12 pairs/POD, etc).

In one embodiment, regardless of how the cameras 1001 are configured, the video stream produced by each capture POD comprises an 8-bit Bayer mosaic at with 12 splits (i.e., 12 different image streams from the 6 pairs of cameras). One or more graphics processing units (GPUs) 1005 then process the video stream in real time as described herein to produce a panoramic VR stream. In the illustrated embodiment, the GPU 1005 performs various image processing functions including, but not limited to, de-mosaic operations, cropping to remove redundant portions of adjacent video streams, lens distortion reduction, color adjustments, and image rotations.

Figure 11:
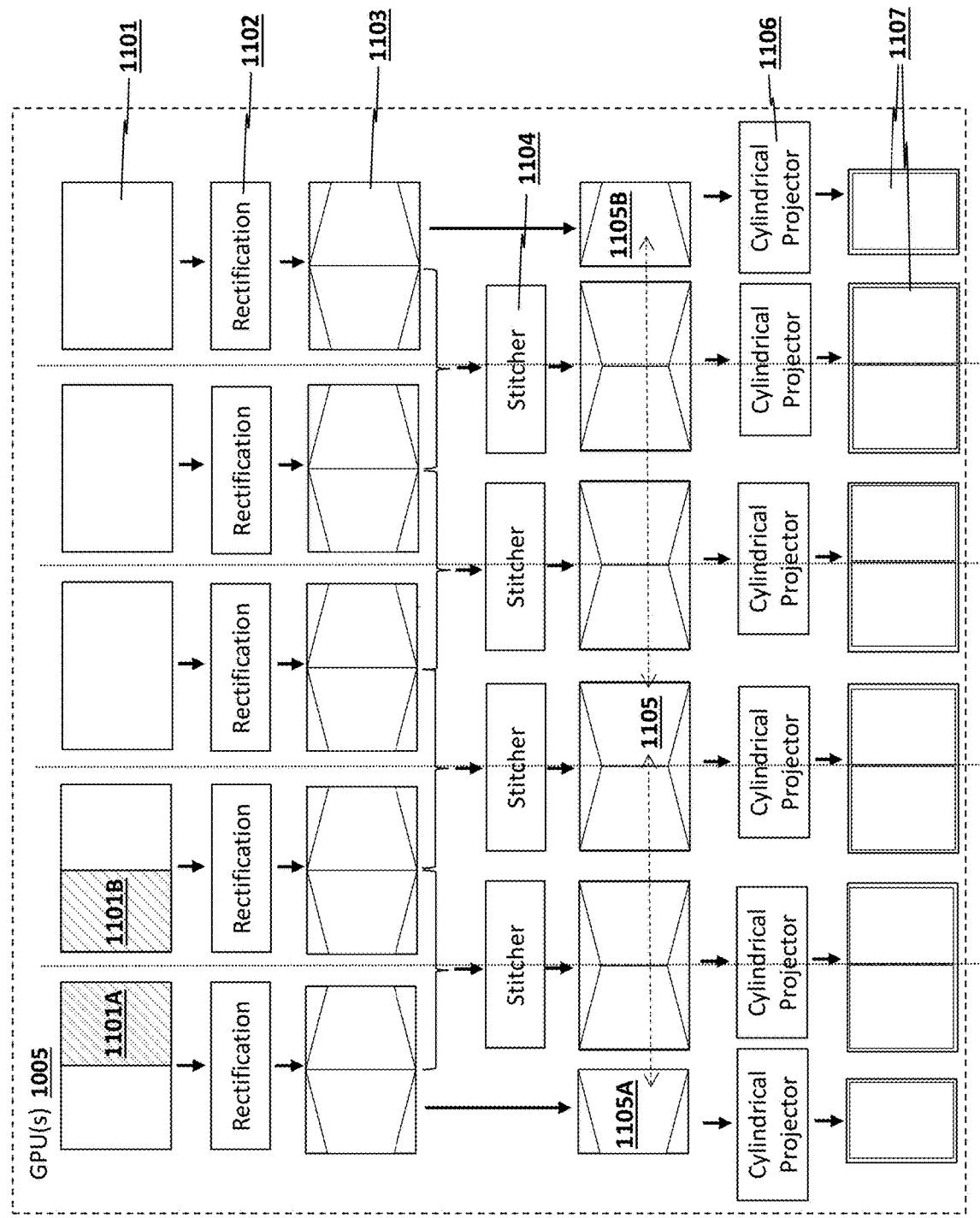
FIG. 11 illustrates one embodiment which performs stitching using rectification followed by cylindrical projection.

Following image processing, the GPU 1005 performs stitch processing 1006 on adjacent image frames to form a stitched panoramic image. One example of the stitch processing 1006 illustrated in FIG. 11 includes rectification operations 1102, stitching operations 1104, and cylindrical projection operations 1106. In particular, FIG. 11 illustrates a specific implementation of stitching using 5 image streams to generate the panoramic image stream. It is assumed that the 5 illustrated streams are processed for one eye (e.g., the left eye) and that the same set of operations are performed concurrently for the other eye (e.g., the right eye).

The highlighted regions 1101A-B of two of the images in the top row of images 1101 indicates the overlapping portions of each image that will be used to identify the stitch. In one embodiment, the width of these regions is set to some fraction of the overall width of each image (e.g., ¼, ⅓, ½). The selected regions include overlapping video content from adjacent images. In one embodiment, the GPU aligns the left image with the right image by analyzing and matching this content. For example, one implementation performs a 2D comparison of the pixel content in each row of pixels. One or more feature points from a first image region (e.g., 1101A) may be identified and used to identify corresponding feature points in the second image region (e.g., 1101B). In other implementations (some of which are described below) a more complex matching model may be used such as belief propagation.

Image rectification 1102 is performed, projecting the images 1103 onto a common image plane. Following rectification, a stitcher 1104 implemented by the GPU uses the designated regions of adjacent rectified images 1103 to match pixels (in accordance with a specified matching algorithm) and identify the correct orientation and overlap between the rectified images 1103. Once the image overlap/orientation is identified, the stitcher 1104 combines each adjacent image to form a plurality of stitched, rectified images 1105. As illustrated, in this particular implementation there are two ½ image portions 1105A-B remaining at each end of the panoramic video.

A cylindrical projector 1106 then projects the stitched images 1105 onto a virtual cylindrical surface to form a smooth, consistent view for the end user in the final panoramic video image 1107.

The embodiments described above may be implemented in software executed on the GPU(s) 1005, by fixed function circuitry, and/or a combination of software and fixed function circuitry (e.g., with some stages being implemented in hardware and others in software). Although not illustrated in the Figures, the data for each image may be stored in a system memory, a caching subsystem on the GPU(s) 1005, a local GPU memory, and/or a GPU register file.

Figure 12A:
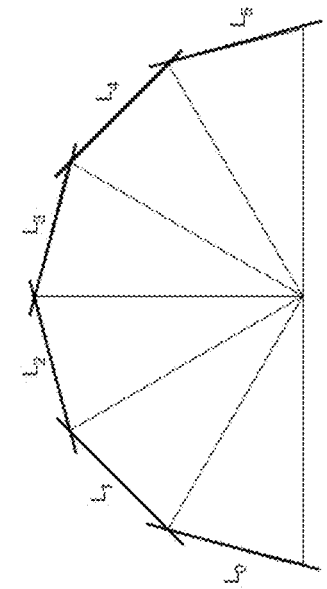
FIGS. 12A-E illustrates a top view of operations performed to generate a panoramic virtual reality video stream.

FIGS. 12A-E illustrate the effects of this sequence of operations on the video images from an elevated perspective (i.e., looking down in a direction parallel to the image planes). In particular, FIG. 12A illustrates six input images $\{L_i\}_{i=0}^{5}$. In one embodiment, correction for lens distortion is performed on the input images at this stage.

Figure 12B:
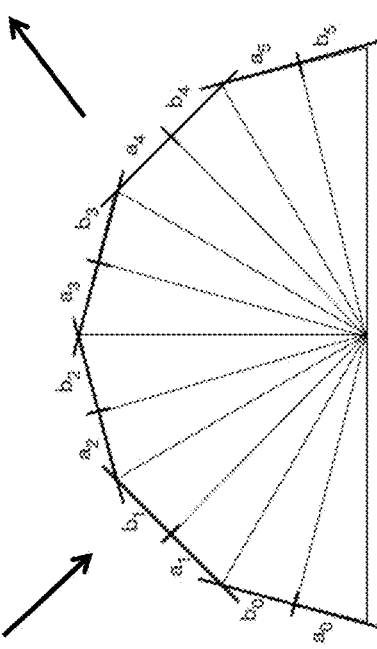
Figure 12C:
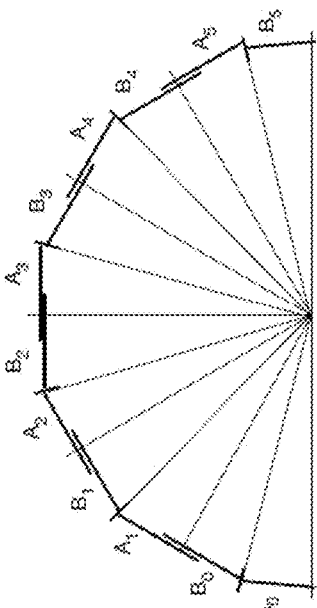

In FIG. 12B, each image is split in half vertically (ai, bi)=split (Li) and in FIG. 12C, each pair $(b_i, a_{i+1})_{i=0}^{4}$ is rectified by a "virtual rotation" about each view's y-axis (which is equivalent to a homography operation). The two end portions $A_0$ and $B_0$ are also rotated but are not involved in stitching. The following code specifies the operations of one embodiment:

for i=0 . . . 4
 $B_i$=rectify($b_i$, □□, left) (□ is determine empirically)
 $A_{i+1}$=rectify($a_i$+1, □, right)
 $A_0$=rectify($a_0$, □, right)
 $B_5$=rectify ($b_5$, □□, left)

Figure 12D:
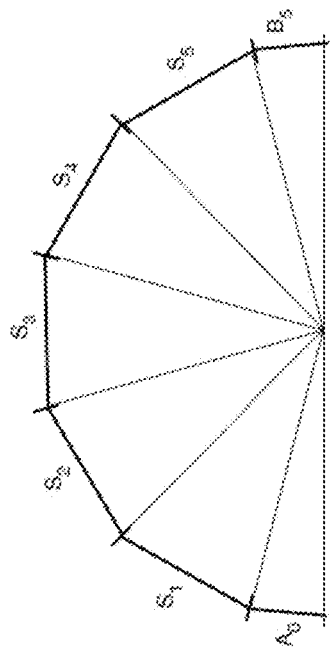
Figure 12E:
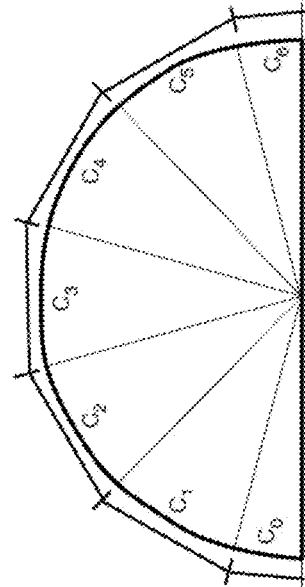

FIG. 12D shows stitching of rectified pairs $S_{i+1}$=stitch($B_i$, $A_{i+1}$)$_{i=0}^{4}$ in accordance with one embodiment. Note that this creates a "crease" at the original image centers, but numerically it is sufficiently precise to not create a "seam." In one embodiment, these creases are removed by the cylindrical projection in the next operation (FIG. 12E). In contrast, prior stitching pipelines generated creases at the stitch which resulted in undesirable distortion and a lower quality stitch.

As illustrated in FIG. 12E, a full cylindrical projection is performed for the five stitched images and "half" cylinder projections for the two end images. This is shown as image frames $S_1$-$S_5$ being curved around the virtual cylinder to form $C_1$-$C_5$ and end image frames $A_0$ and $B_5$ being similarly curved to form $C_0$ and $C_6$, respectively. The seven resulting images are concatenated together to form the final panoramic image, which is then processed by the remaining stages of the pipeline.

Figure 13:
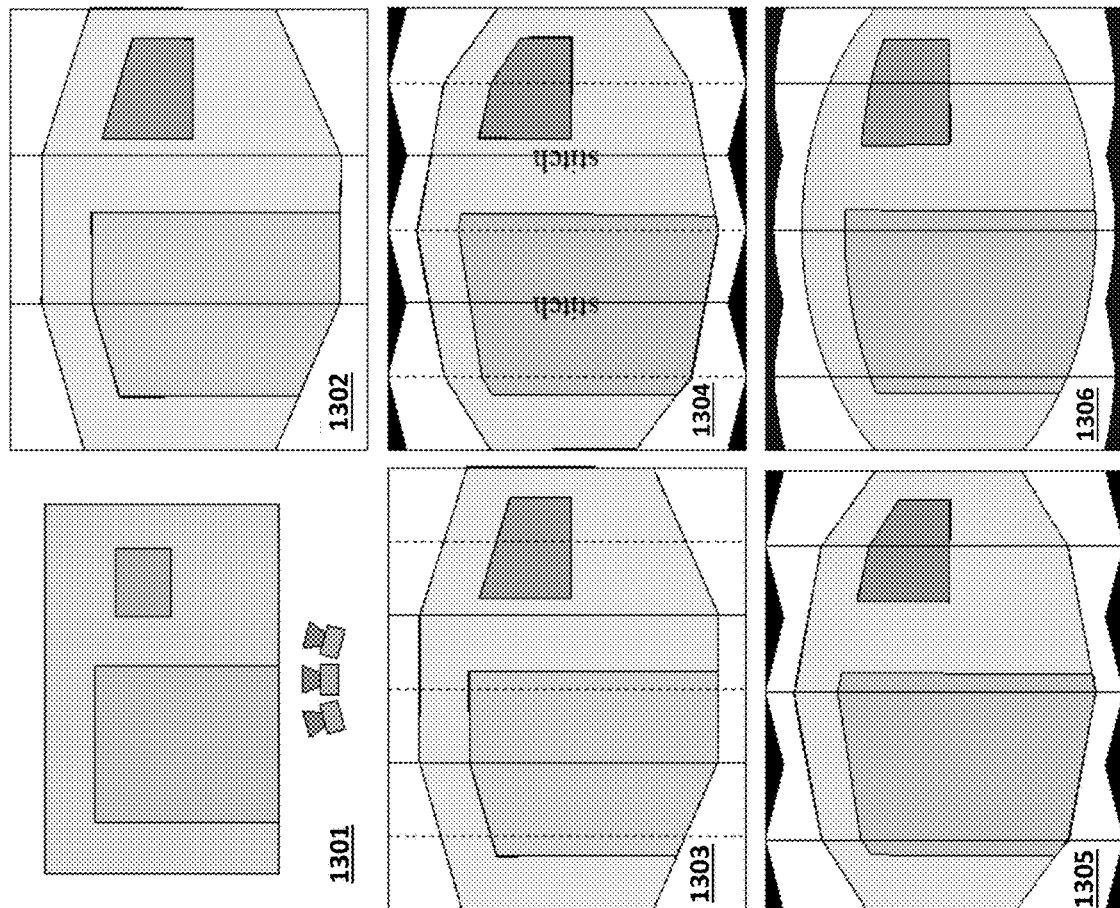
FIG. 13 illustrates a front view of a subset of the operations performed to generate a panoramic virtual reality video stream.

FIG. 13 illustrates another perspective using a simplified set of images 1301-1306 (i.e., captured with three cameras). Image 1301 shows the arrangement of cameras used to capture the video frames shown in image 1302 (overlap not shown). Each image is split vertically in image 1303. In image 1304, each image is transformed using a homography transformation which is a perspective re-projection that effectively rotates neighboring image planes so that they are parallel (see, e.g., FIG. 12C). This rectifies the images fed to the stitcher so that common features are aligned along the same image rows, which is an important operation for fast and accurate stitching.

In image 1305, neighboring images are stitched along their overlapping regions. Note that the homography results in "folds" along the original image center lines. Finally, image 1306 shows a cylindrical projection which is used to create the final panorama Returning to the overall architecture shown in FIG. 10, following rectification, stitching, and cylindrical projection, the GPU 1005 performs RGB to YUV conversion to generate 6 splits (see, e.g., 1107 in FIG. 11). In one embodiment, an NV12 format is used, although the underlying principles of the invention are not limited to any particular format. In the illustrated implementation, a motion JPEG encoder 1007 encodes the image frames 1107 using motion JPEG (i.e., independently encoding each image frame without inter-frame data as used by other video compression algorithms such as MPEG-2).

The encoded/compressed video frames generated by the MJPEG encoder 1007 are packetized by Real-Time Transport Protocol (RTP) packetizer 1008 and stored in a buffer 1009 prior to being transmitted over a network/communication link to RTP depacketizer 1010. While RTP is used to communicate the encoded/compressed video frames in this embodiment, the underlying principles of the invention are not limited to any particular communication protocol.

The depacketized video frames are individually decoded by MJPEG decoder 1011 and scaled 1012 based on desired scaling specifications (e.g., to a height of 800 pixels in one embodiment). The scaled results are temporarily stored in a synchronization buffer 1013. An aggregator 1014 combines multiple video streams, potentially from different capture PODs 1001 and stores the combined streams in a temporary storage 1015 (e.g., such as the overlay buffer described herein).

In one embodiment, an H.264 encoder 1016 encodes the video streams for transmission to end users and a muxer & file writer 1017 generates video files 1018 (e.g., in an MP4 file format) at different compression ratios and/or bitrates. The muxer & file writer 1017 combines the H.264 encoded video with the audio, which is captured and processed in parallel as described directly below.

Returning to the audio processing pipeline, the stereo audio capture unit 1002 captures an audio stream 1003 simultaneously with the video capture techniques described herein. In one embodiment, the stereo audio capture unit 1002 comprises one or more microphones, analog-to-digital converters, and audio compression units to compress the raw audio to generate the audio stream 1003 (e.g., using AAC, MP3 or other audio compression techniques). An audio decoder 1004 decodes the audio stream to a 16-bit PCM format 1021, although various other formats may also be used. An RTP packetizer generates RTP packets in an RTP buffer 1023 for transmission over a communication link/network. At the receiving end, an RTP depacketizer 1024 extracts the PCM audio data from the RTP packets and an AAC encoder 1024 encodes/compresses the PCM audio in accordance with the AAC audio protocol (although other encoding formats may be used).

A media segmenter 1019 temporally subdivides the different audio/video files into segments of a specified duration (e.g., 5 seconds, 10 seconds, 15 seconds, etc) and generates index values for each of the segments. In the illustrated embodiment, a separate set of media segments 1020 are generated for each audio/video file 1018. Once generated, the index values may be used to access the media segments by clients. For example, a user may connect to the real time VR streaming service and be redirected to a particular URL pointing to a particular set of media segments 1020. In one embodiment, the network characteristics of the client's network connection may initially be evaluated to determine an appropriate set of media segments encoded at an appropriate bitrate.

As illustrated one or more metadata injectors 1030, 1040 insert/inject various forms of metadata to the media segments 1020. By way of example, and not limitation, the metadata may include the current scoring and other relevant data associated with the sporting event (e.g., player statistics, rankings, current score, time remaining, etc), information related to the musical performance (e.g., song titles, lyrics, authors, etc), and any other information related to the event. In a sporting implementation, for example, the scoring data and other relevant data may be displayed within a graphical user interface of the VR client and/or integrated directly within the panoramic video stream (e.g., displayed over the actual scoreboard at the event). Moreover, various types of metadata may be injected including HTTP Live Streaming (HLS) metadata injected by an HLS metadata injector 1030 and ID3 metadata injected by the ID3 metadata injector 1040.

In one embodiment, a push unit 1025 dynamically pushes out the various media segments 1020 to one or more cloud services 1026 from which they may be streamed by the VR clients. By way of example, and not limitation, the cloud services 1026 may include the Amazon Web Services (AWS) Cloud Front Web Distribution platform. The pushing of media segments may be done in addition to or instead of providing the media segments 1020 directly to the VR clients via the VR service provider's network.

Figure 14:
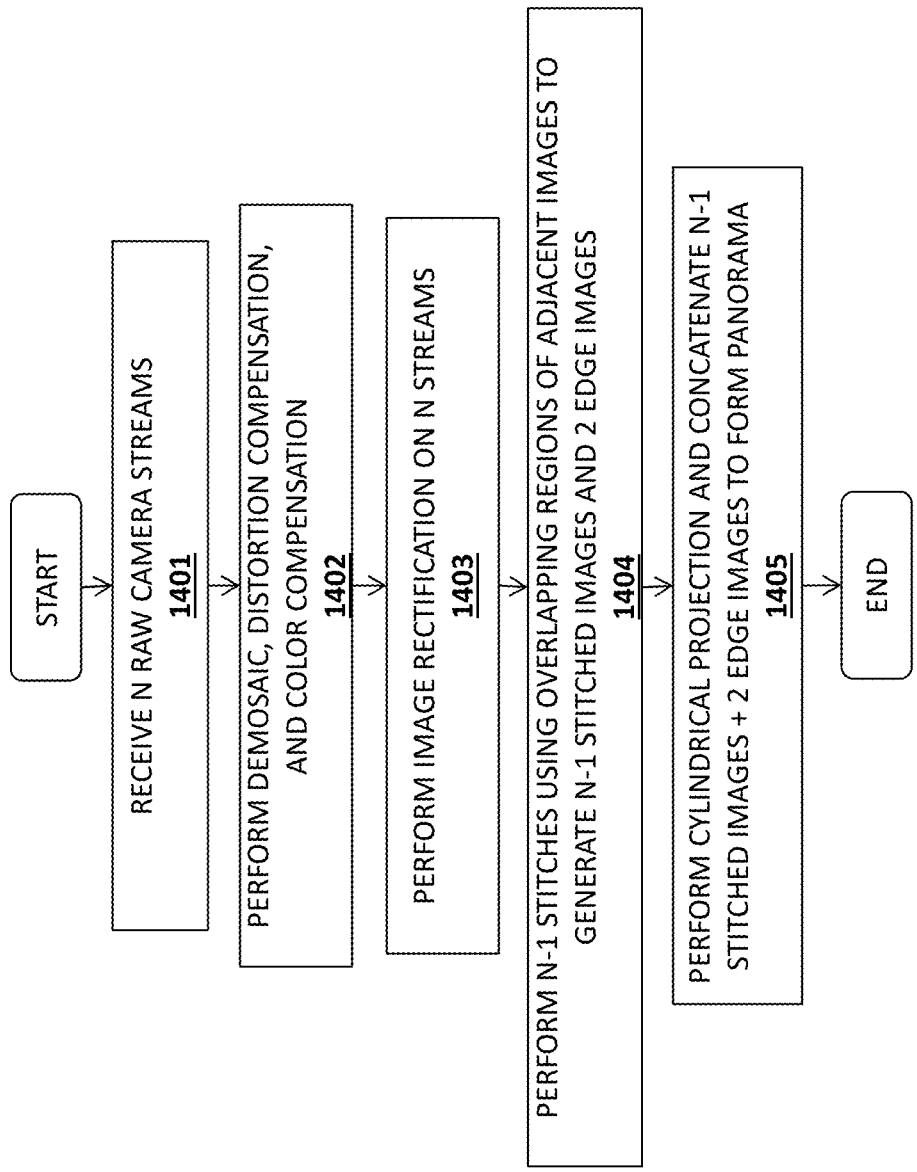
FIG. 14 illustrates a method in accordance with one embodiment of the invention.

A method for efficiently and accurately stitching video images in accordance with one embodiment of the invention is illustrated in FIG. 14. The method may be implemented within the context of the system architectures described above, but is not limited to any particular system architecture. At 1401, N raw camera streams are received (e.g., for each of the left and right eyes). At 1402, demosaicing is performed to reconstruct a full color image from potentially incomplete color samples received from the cameras. Various other image enhancement techniques may also be employed such as distortion compensation and color compensation.

At 1403, image rectification is performed on the N streams and, at 1404, N−1 overlapping regions of adjacent images are processed by the stitching algorithm to produce N−1 stitched images and 2 edge images. At 1405, cylindrical projection and concatenation are performed on the N−1 stitched images and the two edge images to form the panoramic image.

Stitching Using Belief Propagation

As mentioned, one embodiment of the invention employs belief propagation techniques to perform stitching of adjacent images. Belief propagation (BP) (or "sum-product message passing"), is a technique in which inferences are made on graphical models including Bayesian networks and Markov random fields. The belief propagation engine calculates a marginal distribution for each unobserved node, based on observed nodes.

In the context of image stitching, belief propagation is used to identify a most likely matching pixel in a second frame for each pixel in a first frame. Belief propagation has its own internal parameters which dictate how different variables are to be weighted to identify matching pixels. However, the results using standard internal parameters are not ideal.

To address these limitations, one embodiment of the invention performs modifications to the basic belief propagation parameters to generate significantly improved results. In general, there exists a tension between the accuracy of the pixel match and the smoothness/continuity of the seam. Choosing parameters which are weighted towards accuracy will result in degraded continuity and vice-versa. One embodiment of the invention chooses a set of "ideal" parameters based on the requirements of the application.

Figure 15:
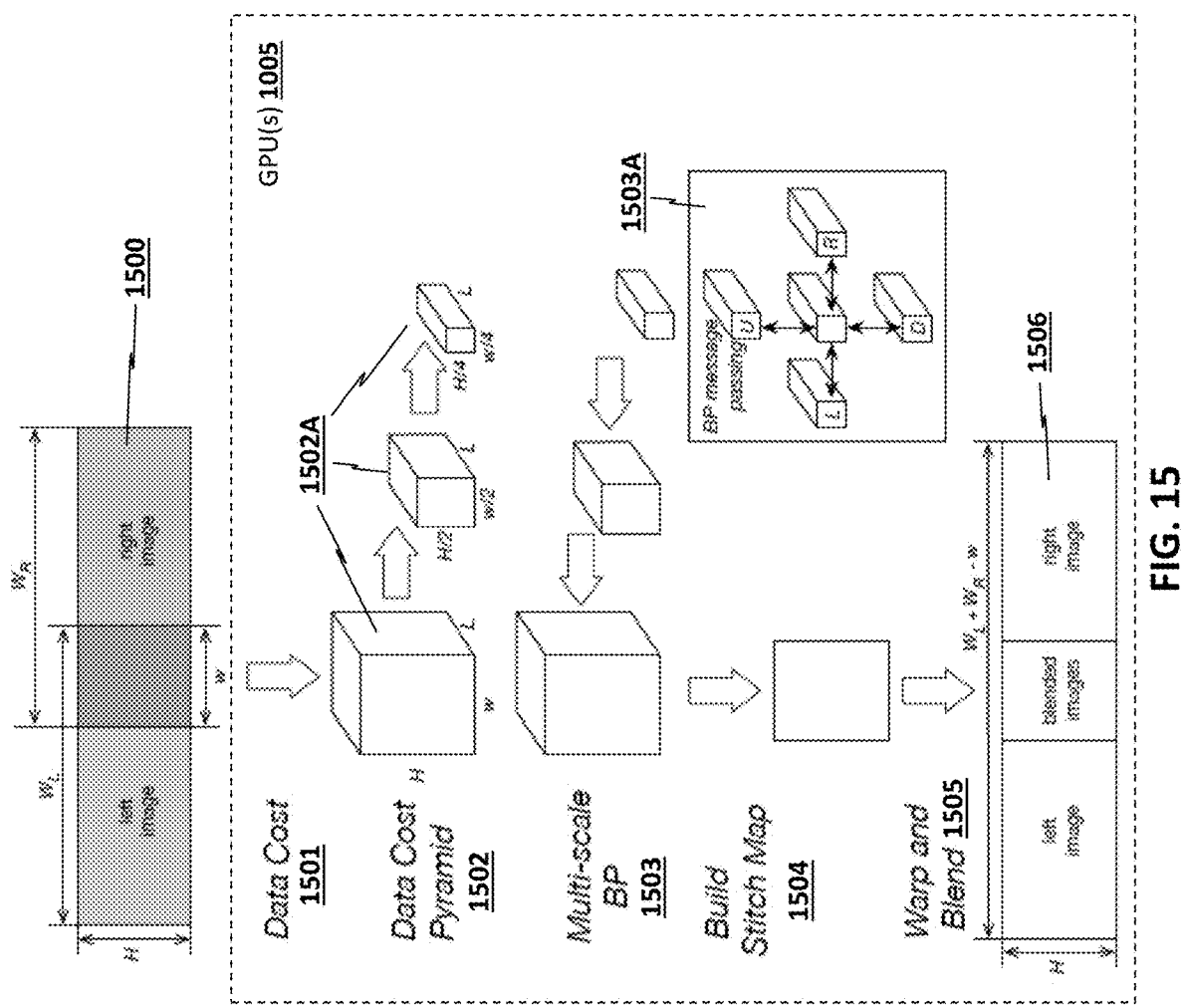
FIG. 15 illustrates one embodiment which performs stitching operations using Belief Propagation.

FIG. 15 illustrates the sequence of operations 1501-1505 performed by one embodiment of the Belief Propagation engine. These operations include initially performing a data cost evaluation 1501 where, for each pixel in the w×H overlapping region between the left and right input image 1500, a cost vector of length L is computed that estimates the initial cost of matching L different candidate pixels between the left and right images.

Each cost value is a real number (e.g., stored as a floating point number). There are many ways to compute this cost such as sum of absolute differences (SAD) or sub of squared differences (SSD). In one embodiment, the result of this computation is a w×H×L "cost volume" of real numbers.

One embodiment finds the index with the lowest cost (i.e., $\text{argmin}_i L_i$), but the result at this stage will be too noisy. A "consensus" will be developed between neighboring pixels on what the costs should be. Creating cost values that are more coherent or "cost smoothing" is the one of the primary functions of Belief Propagation.

The cost $L_i$ is converted into a probability $1/e^{L_i}$ and normalized. The goal is to minimize the cost (energy minimization) or maximize the probability. Different flavors of Belief Propagation. One embodiment is described in terms of energy minimization, sometimes called the "negative log probability space." One implementation also normalizes the colors to adjust for different brightness and exposures between cameras.

Furthermore, in one embodiment, the number of rows of the images being stitched are down-sampled by a factor (e.g., 2, 3, 4, etc) to speed up the process, thereby reducing the memory footprint and enhancing tolerance for misaligned frames. It is assumed that the images have been rectified so that common features are on the same scan lines (i.e., epipolar lines match and are parallel). Additional image processing may be done at this stage as well such as implementing a high-pass filter to reduce noise from cameras (e.g., charge coupled device (CCD) noise).

Following data cost analysis 1501, a data cost pyramid is constructed at 1502. In one embodiment, starting with the initial data cost volume, a series of smaller volumes 1502A are constructed of size $\{w/2^i \times H/2^i \times L | i=0 \dots\}$ that make up the data-cost pyramid by averaging/down-sampling cost values. Note that the cost vectors are still of length L for all volumes in the pyramid.

Starting with the smallest volume in the data-cost pyramid, several iterations of Belief Propagation message passing 1503A are performed. The results are then up-sampled to the next largest volume at 1503 and Belief Propagation message passing 1503A is performed again using the up-sampled values as a starting point. For each step four more volumes are created to hold the messages that are passed up, down, left, and right between neighboring cost vectors. Once the iterations are complete, the final costs are computed from the original cost volume and the message volumes. These are used to seed the iteration at the next higher level.

When the final results are generated, a stitch map is constructed at 1504. In one embodiment, the optimal label i is determined for each pixel by computing the "final beliefs" via $i = \mathrm{argmin}_i L_i$. These indices i identify which two pixels form the best correspondence between the original left and right images in the overlap region. To speed things up, one embodiment short circuits the multi-scale Belief Propagation process by stopping the iterative process and forming the stitch map from a smaller volume. This results in a smaller stitch map that can be bi-linearly sampled from when stitching. In one embodiment, the stitch map is sorted in a hardware texture map managed by the GPU(s) 1005.

The final image is then stitched by performing warping and blending in accordance with the stitch map 1504 to generate the final stitched image frame 1506. In particular, for each pixel in the overlapping region the stitch map is used to determine which two pixels to blend. One embodiment blends using a convex linear combination of pixels from each image:

result pixel=$(1-t)$*left pixel+$t$*right pixel, where t varies from 0 to 1 when moving from left to right across the overlap region. This blend biases towards left pixels on the left edge and biases towards right pixels on the right edge. Pixels in the middle are formed with a weighted average. Laplacian Blending is used in one embodiment to reduce blurring artifacts.

In one implementation, a completely new stitch is performed for every frame. Given the significant processing resources used to identify the stitch, one embodiment of the invention feeds back the previous stitch parameters for one or a combination of previous frames to be used to stitch the current frame.

Figure 16:
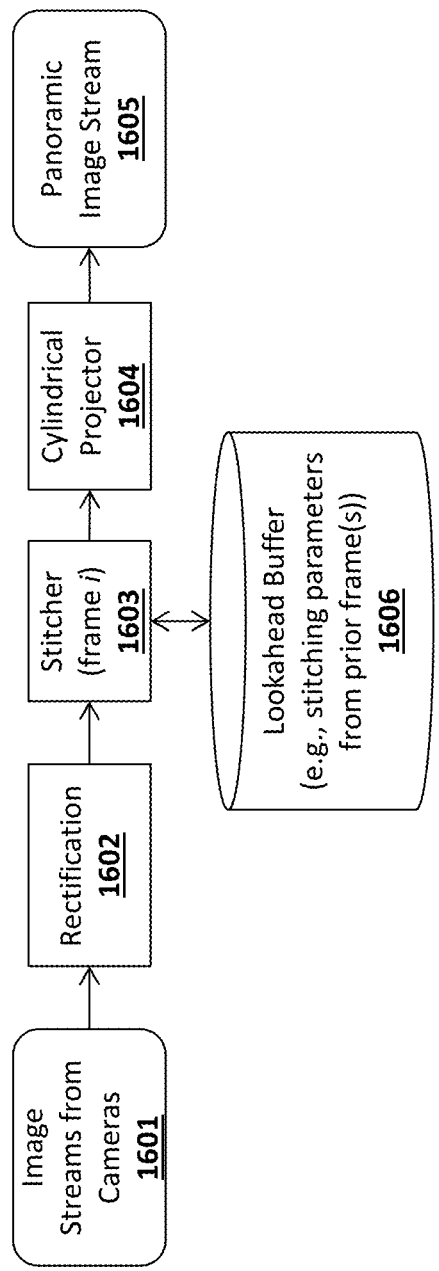
FIG. 16 illustrates a stitching architecture which uses stitching parameters from one or more prior frames to stitch a current frame.

FIG. 16 illustrates one embodiment of an architecture which includes rectification circuitry/logic 1602 for performing rectification of images streams from the cameras 1601 (e.g., of one or more capture PODs) and stitcher circuitry/logic 1603 which stores stitching parameters from prior frames to be used as a starting point. In particular, a lookahead buffer 1606 or other type of storage is used by the stitcher 1603 to store parameters from previous stitches and read those parameters when processing the current set of image frames. For example, the specific location of a set of prior feature points may be stored and used to identify the stitch for the current image frames (or at least as a starting point for the current image frames).

In one embodiment, the parameters from previous stitches may simply be the parameters from the last stitch. In another embodiment a running average of these parameters is maintained (e.g., for the last N stitches). In addition, in an implementation which uses belief propagation, the previously-determined depth map pyramids shown in FIG. 15 may be reused.

In one embodiment, blending between adjacent images is used when a stitch fails. A failed stitch may occur, for example, due to insufficient information, disparate lighting (which may be temporary), and any other circumstances where similarities between pixels cannot be determined.

In response to a failure, one embodiment of the invention analyzes the previous and next scan lines and blends them together. Different types of blending may be selected based on characteristics of the two frames. The blending may include (but is not limited to) linear blending, Laplacian blending, and Gaussian blending. Alternatively, or in addition, when pixels cannot be differentiated, the stitch parameters from one or more prior stitches may be used (as described above).

In one embodiment, the luminance (Y) plane is used to perform stitching operations, excluding the U and V planes, to reduce the amount of data required for stitching. Color does not provide significant value for stitching, unless certain types of operations such as background subtraction are used. Thus, the stitching pipeline is optimized with YUV requiring less memory and less time for conversions.

In one implementation, if two Y values from the two frames are identical or within a specified threshold, the U and the V values may then be evaluated to provide further differentiation between the pixels (e.g., to determine whether they have similar/same colors) thereby providing a more efficient culling mechanism (i.e., to cull candidates which are outside of the threshold).

One embodiment the invention quantifies stitch accuracy, potentially evaluating each seam down to a single number. As the stitch is changed, this embodiment searches for patterns, evaluates the associated numbers and identifies the one with the highest quantity as the stitch. This may be performed for each scan line where the belief propagation algorithm determines the extent to which this is a good stitch (i.e., quantifies the stitch accuracy).

Different types of variables may be evaluated to arrive at the number including data cost (how well left matches right pixel) and smoothness (how well two neighboring pixels agree).

Bandwidth Reduction and Failure Recovery

In circumstances where network bandwidth is severely limited and/or in cases where one of the camera streams is non-functional or occluded, one embodiment reproduces one stream (e.g., which is occluded) using video streams from one or more adjacent cameras. For example, in one embodiment, in response to detecting that a stream from camera N is detected (e.g., the left eye stream in a left/right stereoscopic pair of cameras) one embodiment of the invention performs an image transformation on the stream from adjacent cameras N+1 and/or N−1 to reproduce the camera N stream.

Figure 17:
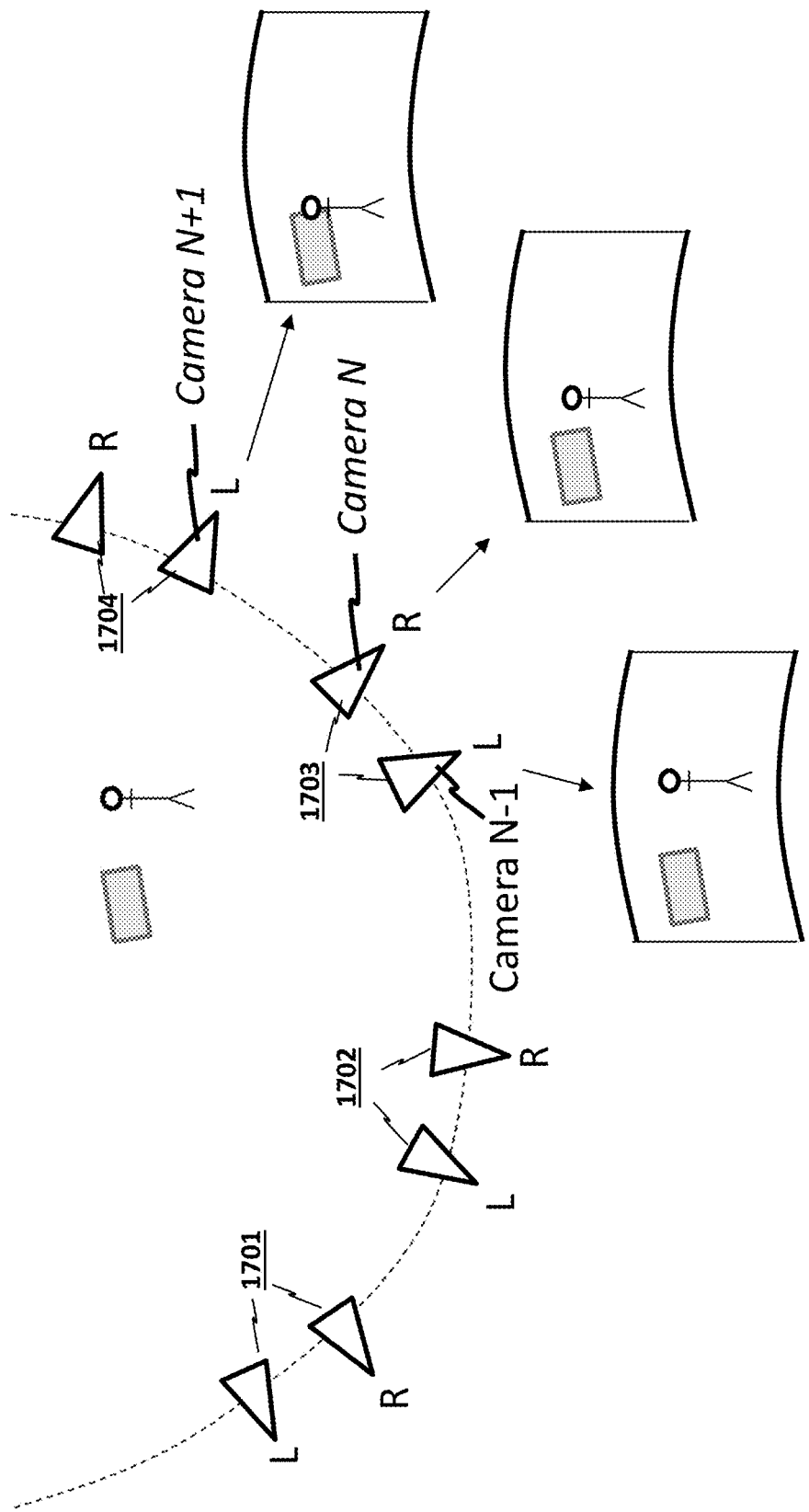
FIG. 17 illustrates one embodiment which performs coordinate transformations to reduce bandwidth and/or storage.

FIG. 17 illustrates an example arrangement in which a plurality of left/right cameras 1701-1704 capture an event from different viewpoints. An image of a stick figure is captured relative to a grey rectangle. These two objects are used to illustrate the manner in which the perspective changes from camera N−1 to camera N+1. For example, in the video stream from camera N−1, there is a larger separation between the two objects while from camera N+1, there is no separation (i.e., the user is occluding a portion of the rectangle).

It can be seen from this arrangement, that there is a significant overlap in the image data captured by cameras N, N+1, and N−1. The embodiments of the invention take advantage of this overlap to reduce bandwidth and/or compensate for the failure or camera N. For example, per-camera transformation matrices may be calculated prior to an event based on the orientation differences between a first camera (e.g., camera N) and one or more adjacent cameras (e.g., camera N+1). If the differences in orientation of the two cameras is known (e.g., X, Y, Z vector defining the 3D direction each camera is pointing, the distance to the event objects from the cameras, etc) then these differences may be used to generate a transformation matrix for camera N which can be used to reconstruct it's video stream.

In one embodiment, two transformation matrices are generated for camera N: one for camera N+1 and one for camera N−1. Using two cameras ensures that all of the necessary video data will be available to reconstruct camera N's video stream. However, in other embodiments, only one video stream from one adjacent camera is used. In this case, the camera selected for the reconstruction should be the corresponding left/right camera. For example, if camera N is a left eye camera, then camera N+1 (used for the transformation) should be the corresponding right eye camera. Choosing the alternate eye camera makes sense given the significant correlation in orientation between the left/right cameras. If there are portions of the image which cannot be reconstructed, these portions may be identified in the video stream from camera N−1 (e.g., the right camera of the adjacent pair of cameras). The camera N matrix associated with camera N−1 may be used to fill in any holes in the transformation performed on the video stream from camera N+1.

Figure 18:
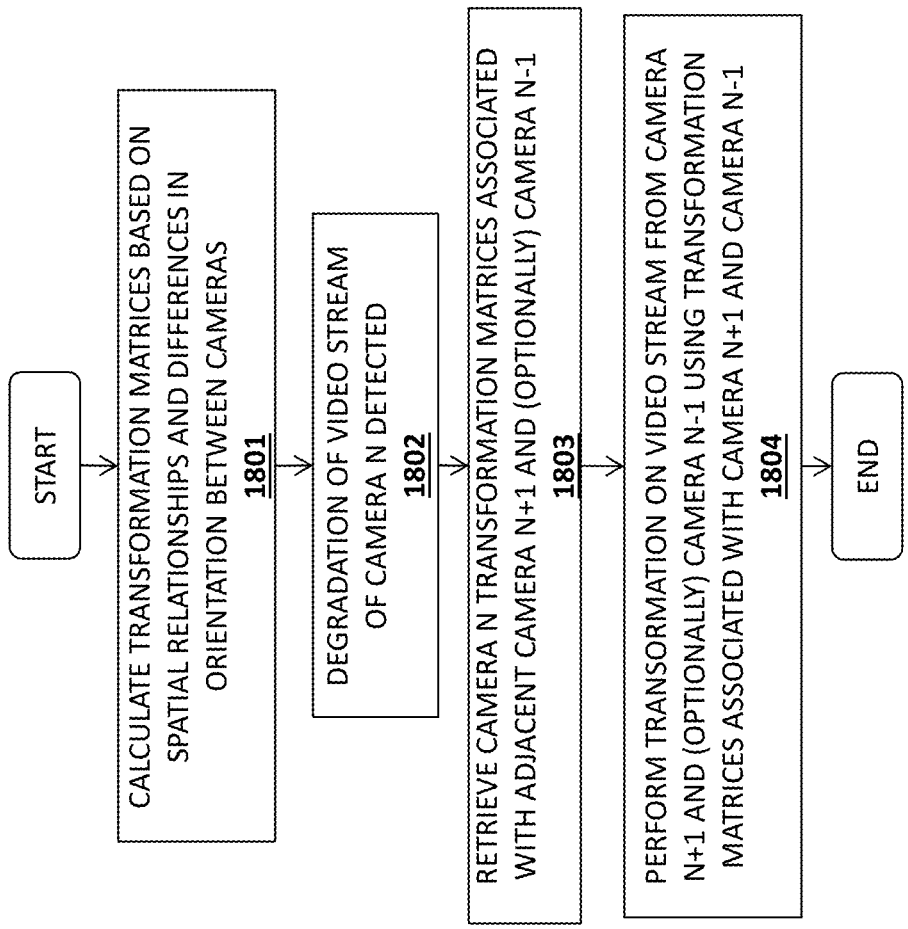
FIG. 18 illustrates a method in accordance with one embodiment of the invention.

A method in accordance with one embodiment of the invention is illustrated in FIG. 18. At 1801, transformation matrices are calculated for each camera, based on spatial relationships and differences in orientation between cameras. At 1802, a degradation of a video stream of camera N is detected. For example, camera N may have failed or may there may be bandwidth issues with the network link.

At 1803, the transformation matrices associated with adjacent cameras N+1 and N−1 are retrieved and, at 1804, a transformation is performed on one or both of the video streams from camera N+1 and camera N−1. For example, the camera N matrix associated with camera N+1 may be used to transform camera N+1's video stream using the transformation matrix to reconstruct the video stream from the perspective of camera N. In one embodiment, the camera selected for the reconstruction is one of the left/right pair. For example, if camera N is a left eye camera, then camera N+1 (used for the transformation) is the corresponding right eye camera. Choosing the alternate eye camera makes sense given the significant correlation in orientation between the left/right cameras.

If there are portions of the image which cannot be reconstructed, these portions may be identified in the video stream from camera N−1 (e.g., the right camera of the adjacent pair of cameras). The camera N matrix associated with camera N−1 may be used to fill in any holes in the transformation performed on the video stream from camera N+1.

Figure 19:
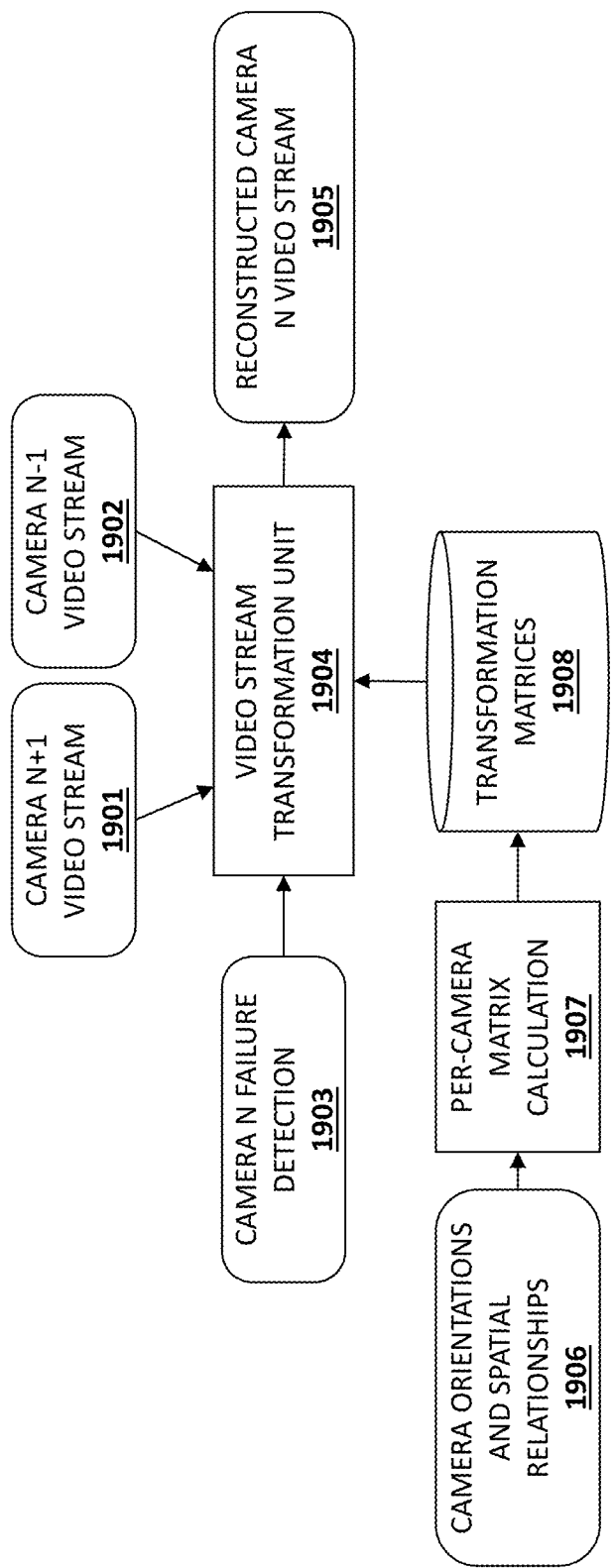
FIG. 19 illustrates an architecture for performing viewing transformations on virtual reality video streams to adjust.

FIG. 19 illustrates an example architecture which includes a per-camera matrix calculation unit 1907 for calculating the various transformation matrices 1908 described herein based on the camera orientations and relative spatial relationships of the cameras 1906 (as described above). In one embodiment, the transformation matrices 1908 are stored for later use.

In response to a failure detection unit 1903 (e.g., a microservices-based monitoring system) detecting a failure of camera N, a video stream transformation unit 1904 reconstructs camera N's video stream based on the video streams of camera N+1 and camera N−1. As mentioned above, the camera N matrix associated with camera N+1 may be used to transform camera N+1's video stream using the transformation matrix to reconstruct the video stream from the perspective of camera N. If there are portions of the image which cannot be reconstructed, these portions may be identified in the video stream from camera N−1. The camera N matrix associated with camera N−1 may be used to fill in any holes in the transformation performed on the video stream from camera N+1.

The techniques described here may be used for a variety of circumstances including, but not limited to insufficient bandwidth, occlusion by objects, and/or equipment failures. While the embodiments described above focus on a camera failure, one embodiment performs the techniques described herein for the sole purpose of reducing bandwidth.

In addition, in one embodiment, the techniques described above are used for efficiently storing video streams of an event for later playback (e.g., after the event has ended). The amount of mass storage space consumed by 6-12 5k video streams is significant. Moreover, in one implementation, capture PODs capture video using motion JPEG (see, e.g., FIG. 10, and MJPEG encoder 1007) which consumes significant bandwidth and storage space.

To reduce bandwidth, only a subset of the camera video streams are recorded for subsequent playback. When a user chooses to watch the recorded event, the transformation matrices are used to reconstruct those video streams which were not recorded. For example, only the left eye cameras may be recorded, and the transformation matrices may be used to reconstruct all of the right eye video streams.

In one embodiment, assuming that each left/right stream was captured, then a difference calculation unit may determine differences between the left and right streams. These differences can then be stored along with one of the two streams. For example, a disparity between adjacent streams (potentially from different pods) may be calculated and only one complete motion jpeg stream may be saved/transmitted. The other stream may be saved using differences between the motion jpeg stream and then reconstructed at the decoder, thereby removing a significant amount of redundancy.

Depth maps may also be generated and used by the algorithm to perform reconstruction of the original stream(s). For example, a monoscopic feed and a depth map may be used to reconstruct a stereo feed. The resolution of this depth map can be quite low. Disparity every inch, for example, is not required. At a low granularity, the depth map can be encoded using 8 bits total (e.g., granularity of 5-10 feet). Special types of processing may be performed for occluded objects (e.g., switching to data reduncancy).

Key and Fill Compositing

Figure 20:
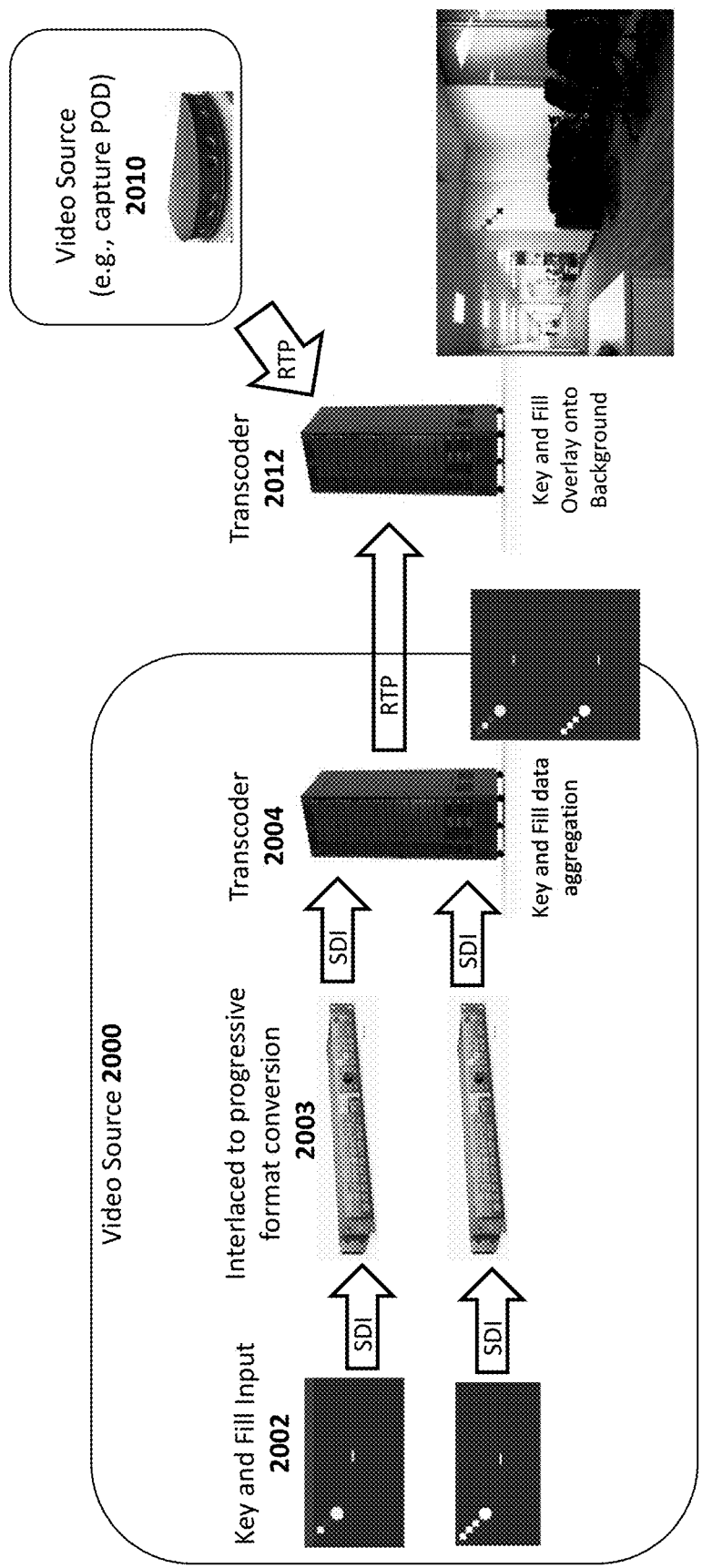
FIG. 20 illustrates one embodiment in which key and fill signals are used for inserting content into a captured video stream.

Referring to FIG. 20, one embodiment of the invention includes multiple transcoders 2004, 2012 to composite video or graphics from another source as a key and fill operation to the synchronized multi-camera VR feeds described herein. In one embodiment, the key is implemented as an alpha channel and fill is implemented as the color channel. A first video source 2000 receives key and fill input 2002 from one or more sources. Video processing circuitry/software 2003 equipped with a serial digital interface (SDI) (potentially on an SDI card) performs interlaced-to-progressive conversion. In one embodiment, this is accomplished by one or more Teranex standards converters, although the underlying principles of the invention are not limited to any particular digital video formats or converters.

After conversion, the progressive video streams are sent via one or more SDI outputs to a first transcoder 2004 which performs key and fill data aggregation on the inputs. The resulting stream is packetized and transmitted to a second transcoder 2012. In one embodiment, the Real-time Transport Protocol (RTP) is used for packetization and streaming, although the underlying principles of the invention are not limited to any particular transmission protocol. The second transcoder 2012 also receives a "background" video stream from a second video source 2010 which, in one implementation, is video captured by one or more capture PODs 1001. The second transcoder 2010 then overlays the key and fill stream onto the background video stream, effectively allowing different types of graphics and graphical effects to be displayed within the panoramic virtual reality image. In one embodiment, the overlay and background video are synchronized.

Parallax can be applied to the overlay so that the view can include depth effects within the panoramic virtual reality video. The composited video or graphics can be used to show event-related, real-time data (such as a game clock, score, statistics, or other relevant data) or can be used as virtual jumbotron and/or a virtual advertisement board.

In one embodiment, the background video is in received in a stereo format, with a left eye view and a right eye view. The overlay video received from video source 2000 may have two channels, one for color and one for transparency. The two videos are timestamped by a single synchronizer and transported over RTP. The transcoder 2012, which may be a compositing video server, receives and aggregates (buffers) timestamped video frames from both sources 2000, 2010 and finds matching frames based on the timestamps to composite the overlay video over the background video. When the overlay is composited, one embodiment of the transcoder 2012 applies parallax to the overlay (e.g., by locating the overlay in slightly different positions for the right and left eyes) to give the viewer a sense of depth in the virtual reality scene.

The embodiments described above provide the ability to composite video or graphics from another source as key and fill using the alpha channel and color channel, respectively, to the synchronized multi-camera virtual reality feeds (video source 2010).

Some embodiments described herein employ a distributed architecture in which service components are accessed remotely through a remote-access protocol, so these components can communicate across different processes, servers and networks. Similar to Object-Oriented Design (OOD) in software architecture, distributed architectures lend themselves to more loosely coupled, encapsulated and modular applications. This in turn promotes improved scalability, modularity and control over development, testing, and deployment of back-end service modules.

In the context of a service-based architecture for a distributed VR broadcasting system as described herein, portions of the overall architecture may be encapsulated into independent services. For example, a first Microservice is used for heart-beat injection, a second Microservice for capture controls, a third Microservice for meta-data injection, and a fourth Microservice for real-time operation monitoring. All services may be developed and maintained independently but designed to work with the overall system.

This service-oriented approach is beneficial for a variety of reasons. First, different programming languages can be used for different services (e.g., C++, C#, Swift, etc). This works particularly well in environments where different team members have expertise in different areas. While some engineers are adding more features to one Microservice others can work on other Microservices concurrently. This helps parallelize the development effort for different deliverables.

Figure 21:
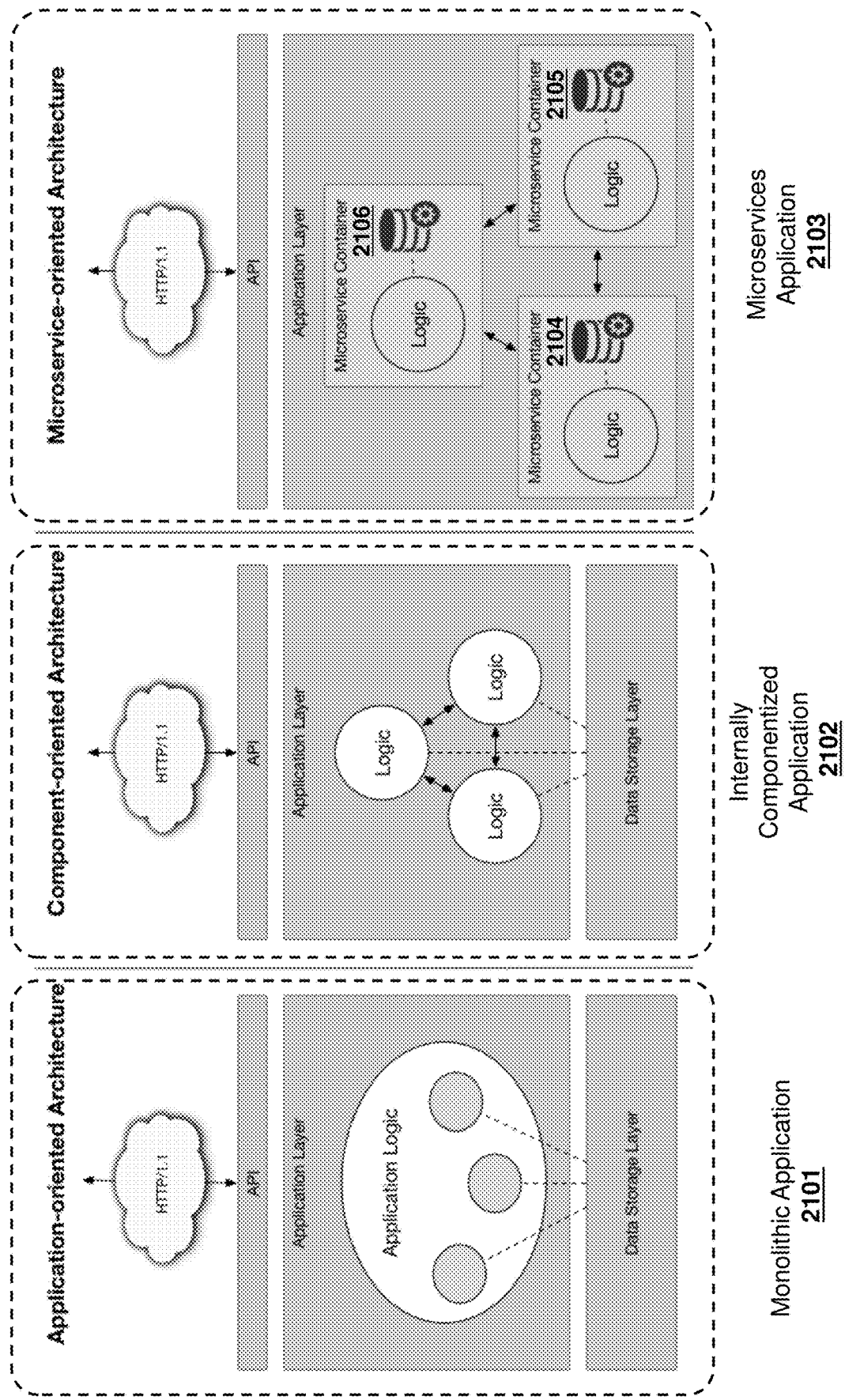
FIG. 21 illustrates a comparison between a microservices architecture and other architectures.

One of the differences between microservices and service-oriented architecture (SOA) is service granularity. The principle for microservices is to take the modularity of service-oriented architecture further into smaller and more manageable functional units. The concept of microservices, as compared with monolithic application 2101 and internally componentized application 2102, is illustrated in FIG. 21. The illustrated microservices application 2103 comprises a plurality of interconnected microservice components 2104-2105 which may be independently executed and updated.

Apparatus and System for Point-Cloud Based Virtual Camera Configuration and Selection In a panoramic VR environment as described above, 30+ physical cameras may be strategically positioned throughout an event venue, potentially resulting in variable video stream quality based on availability, latency, and content output quality. Moreover, streams from any number of virtual cameras may be configured as described herein to follow objects at the event (e.g., the ball, specific players, etc) and specific physical locations.

The embodiments of the invention provide an intuitive way to configure these virtual cameras. For example, in one embodiment, both static and dynamic virtual cameras are configured at different coordinates of the venue. In addition, for certain live streams (e.g., high quality, producer-enabled streams), one embodiment of the invention provides for filtering of raw streams from both physical and virtual cameras down to the N streams needed for fans and content generation (e.g., where N may be any number including 3, 4, 10, etc). In one implementation, the video streams are evaluated for quality (e.g., using various quality metrics) and only high quality virtual camera streams in live broadcasting sports games.

One embodiment of the invention includes a quality control tool used to evaluate volumetric live streams. This quality control tool is sometimes referred to herein as the "quality guardian" tool and may be implemented in software (e.g., an application), hardware, or any combination thereof. Using the quality control tool, an associated producer/director selects video streams that are deemed to be of "good enough quality" to be made available to the producer/director for sending to fans as user-selectable cameras, instant replay generation, and live broadcast. In other words, the quality control tool turns raw volumetric live streams into high quality producer-enabled streams. The ability to configure virtual cameras and provide users with the highest quality virtual camera views greatly enhances the user experience.

Figure 22:
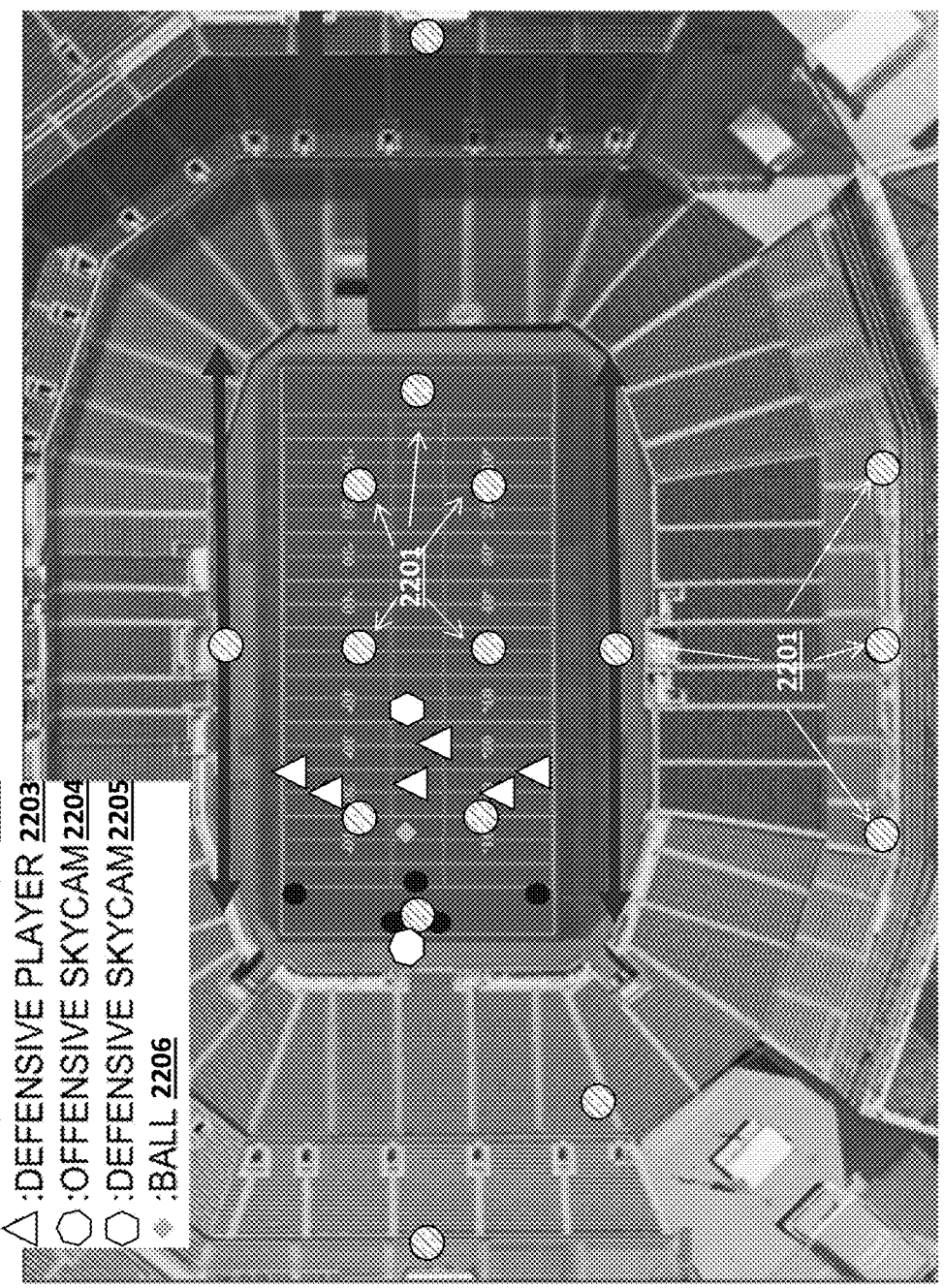
FIG. 22 illustrates one embodiment of a graphical user interface for visualizing camera positions within a field of play.

FIG. 22 illustrates an example arrangement of virtual cameras and objects from directly above a football stadium. The larger circles 2201 indicate virtual cameras, the smaller circles 2202 indicate offensive players, triangles 2203 indicate defensive players, the heptagon 2204 identifies an offensive cable-suspended camera system (e.g., such as skycam and CableCam), the hexagon 2205 indicates a corresponding defensive cable-suspended camera system, and a diamond 2206 identifies the ball.

Note that the "virtual camera" locations shown in FIG. 22 do not necessarily correspond to locations of any physical cameras or other hardware. Rather, the "virtual cameras" in one embodiment are realized by performing transforms on physical camera streams (e.g., using transformation matrices as described above with respect to FIGS. 17-19) to render each virtual camera stream from its specified location and orientation. Thus, given an accurate set of transformation matrices, a virtual camera stream may be generated from any location within the event venue, including the field.

In one embodiment, the virtual cameras render image frames from a specified location (e.g., x, y, z coordinates) and with a particular view orientation (i.e., a direction of view). In one implementation, the coordinates and orientation of each virtual camera are statically specified by the video production team prior to or during the event. Alternatively, or in addition, one or more virtual cameras may be dynamically positioned in response to input from the video production team and/or end users. For example, end users and/or members of the production team may be provided with the ability to select a particular location on the field from which to view the game. In response, a "virtual camera" is rendered at that location to generate its video stream based on the coordinate data and the physical video streams.

In one embodiment, before virtual cameras (sometimes "VCAMs") are selected in the quality control tool/application, presets of VCAM groups are configured using a VCAM configuration tool (VCT), which may be implemented as a component within the quality control tool or as a stand-alone application.

Figure 23:
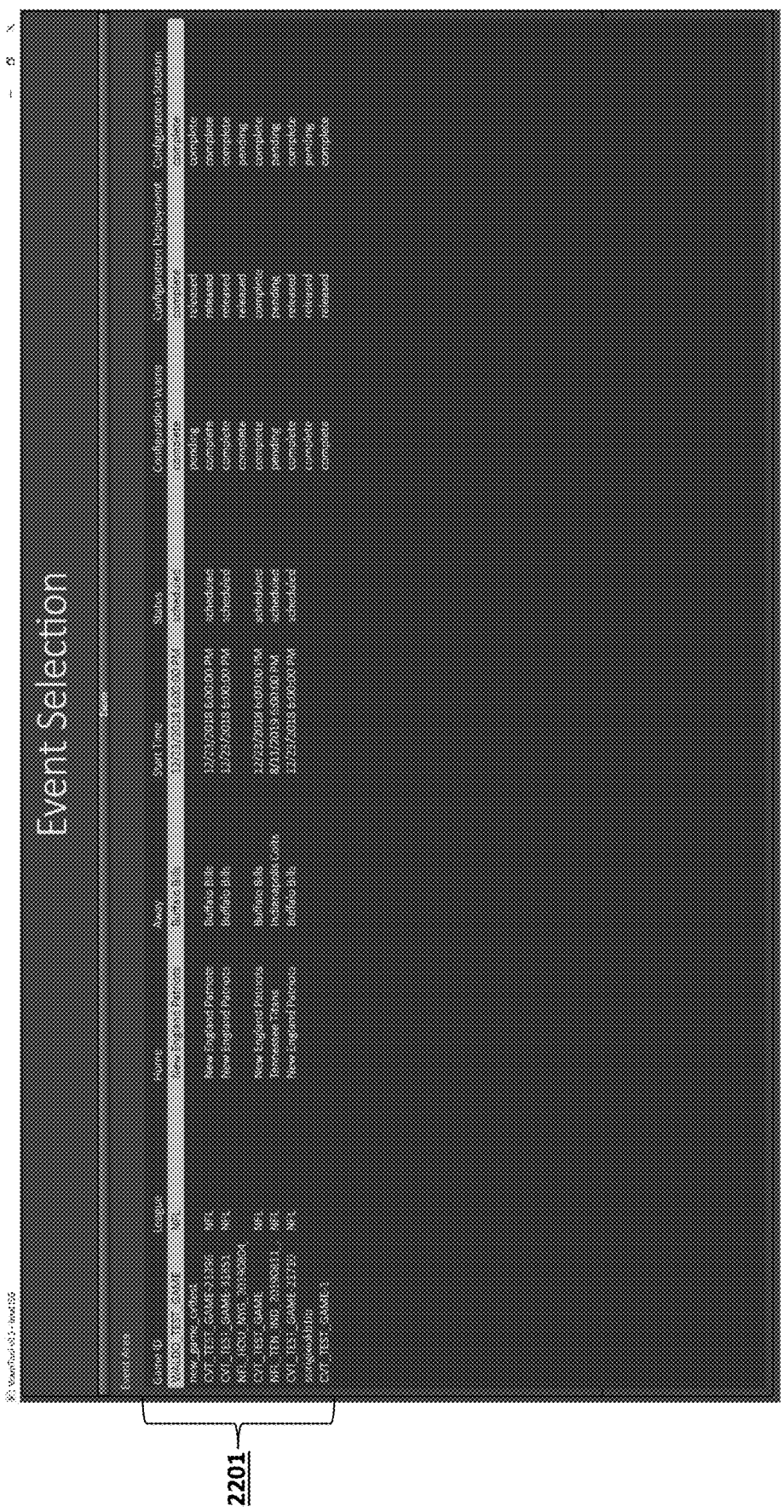
FIG. 23 illustrates an event selection window in accordance with one embodiment.

In one embodiment, after a user successfully logs in to the quality control tool, and chooses the VCT option (or executes a separate VCT application), the user is presented with a screen with a list of events 2301 eligible for configuration, as illustrated in FIG. 23. In one embodiment, the list includes all events which the video production team/company is scheduled to capture and/or broadcast using the techniques described herein.

Figure 24:
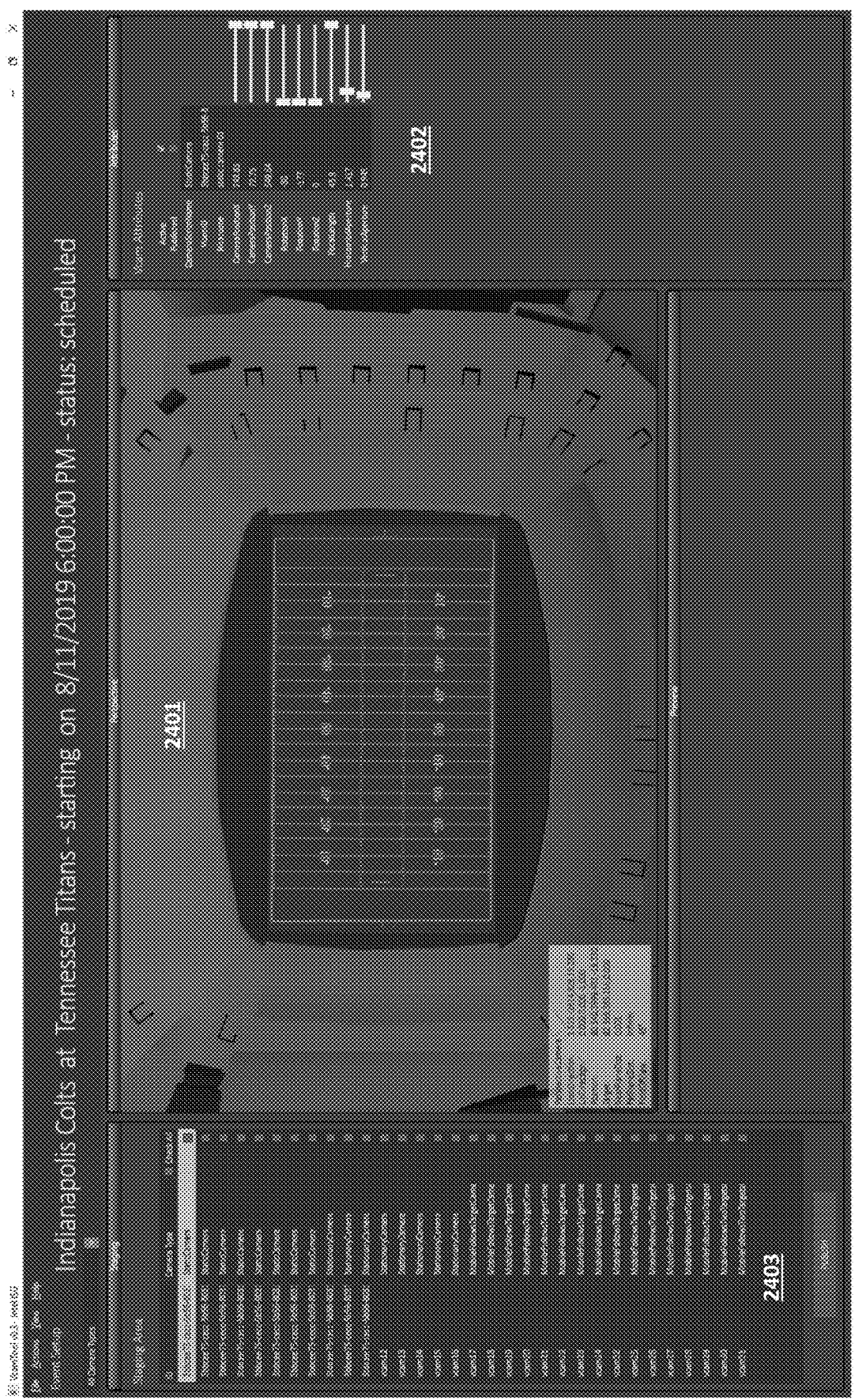
FIG. 24 illustrates another graphical user interface with regions for configuring virtual cameras.

After an event is chosen, an event setup graphical user interface for the selected event is rendered such as that shown in FIG. 24 with a view of the field and stands (or court, ice, venue layout, etc, depending on the type of event) in a center region 2401. In one embodiment, new static, stationary, or mobile cameras are entered and configured by the user in the left window pane 2403 (e.g., by selecting a camera entry via a cursor control device) and the resulting configuration is displayed in the right pane 2402. In one embodiment, a user may enter new cameras on the left pane or check the checkboxes corresponding to one or more of the cameras, those cameras are displayed over the field in the right pane.

The graphical representation of the cameras may be 2D (e.g., such as shown in FIG. 22). Alternatively, a CG-based preview and/or in-venue 3D representation of the VCAMs may be generated. In one embodiment, upon selecting a VCAM or physical camera in the left pane 2403, the user is provided with the opportunity to edit the camera properties (including the properties described herein) for that event via a series of data entry fields. In FIG. 24, the camera properties of one or more selected VCAMs are configured via the right-most pane 2402, titled "VCAM attributes." The properties/attributes include a camera name, an ID code uniquely identifying the camera, VCAM coordinates (x, y, and z), and VCAM rotation (e.g., x, y, and z to specify a direction in which the camera is pointing).

Figure 25:
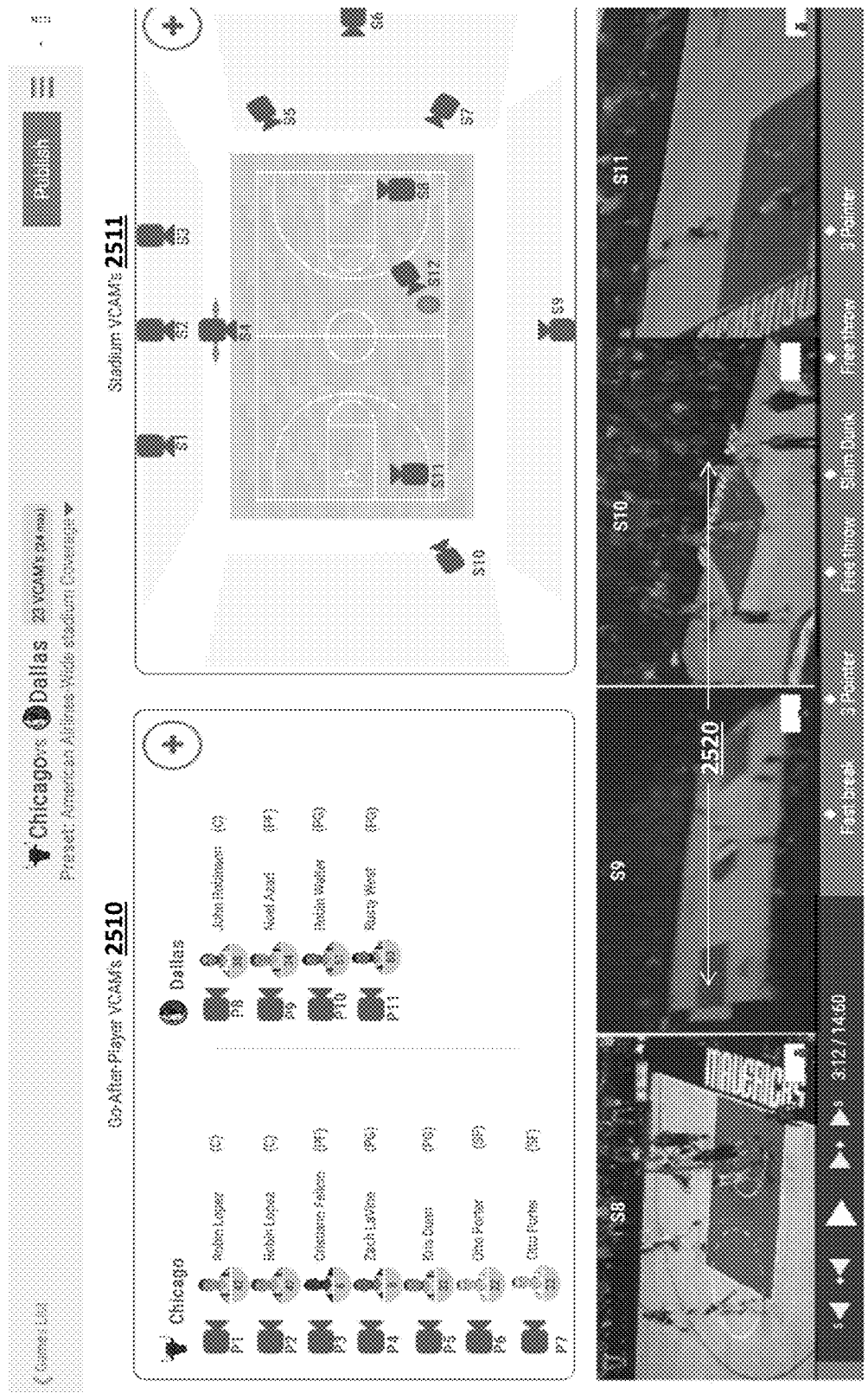
FIG. 25 illustrates another graphical user interface for mapping virtual cameras to players and court positions.

After the virtual cameras have been configured via the game event screen, the information associated with the event, venue, and players are displayed together on a Game Dashboard graphical user interface 2401, one embodiment of which is illustrated in FIG. 25.

One group of cameras shows Stadium VCAMs 2511 and another group shows go-after-player VCAMs 2510 which follow the indicated players on the court, ice, or field. In one embodiment, each VCAM from the two groups may be selected via a cursor control device. In response, the video from the selected VCAM is rendered in a video region 2520 at the bottom of the game screen.

In one embodiment, Stadium VCAMs are of two kinds: static and stationary. Both have a fixed 3D location on the venue, vertical and horizontal FOVs, and focal length. The stationary camera differs from the static camera because stationary cameras can also track a target (e.g., a player or ball); therefore having a tracking-algorithm-driven pitch, yaw and roll. While configured with dynamic orientation, the stationary cameras do not change their 3D position as the tracked target moves.

Figure 26:
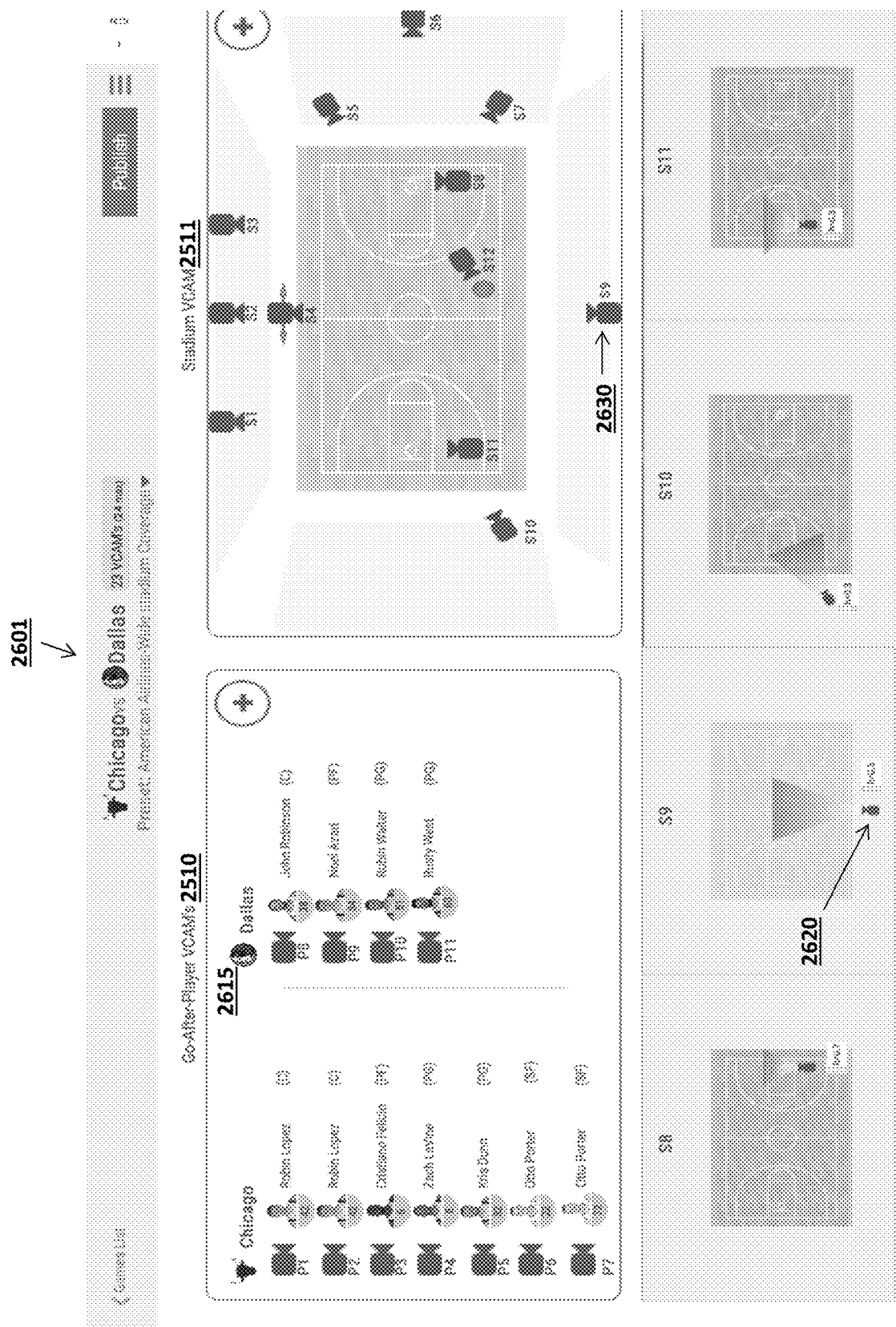
FIG. 26 illustrates a graphical user interface showing virtual camera fields of view.

FIG. 26 illustrates a graphical user interface (GUI) 2601 for adjusting the stadium VCAMs 2510-2511. The user may select a stadium camera graphic such as S9 2630 in the upper right pane (e.g., via a mouse right/left click and hold) and move the camera to different positions and orientations. In response, the lower pane displays the new view from camera S9, including the field of view identified via a triangular pattern as illustrated.

Figure 27:
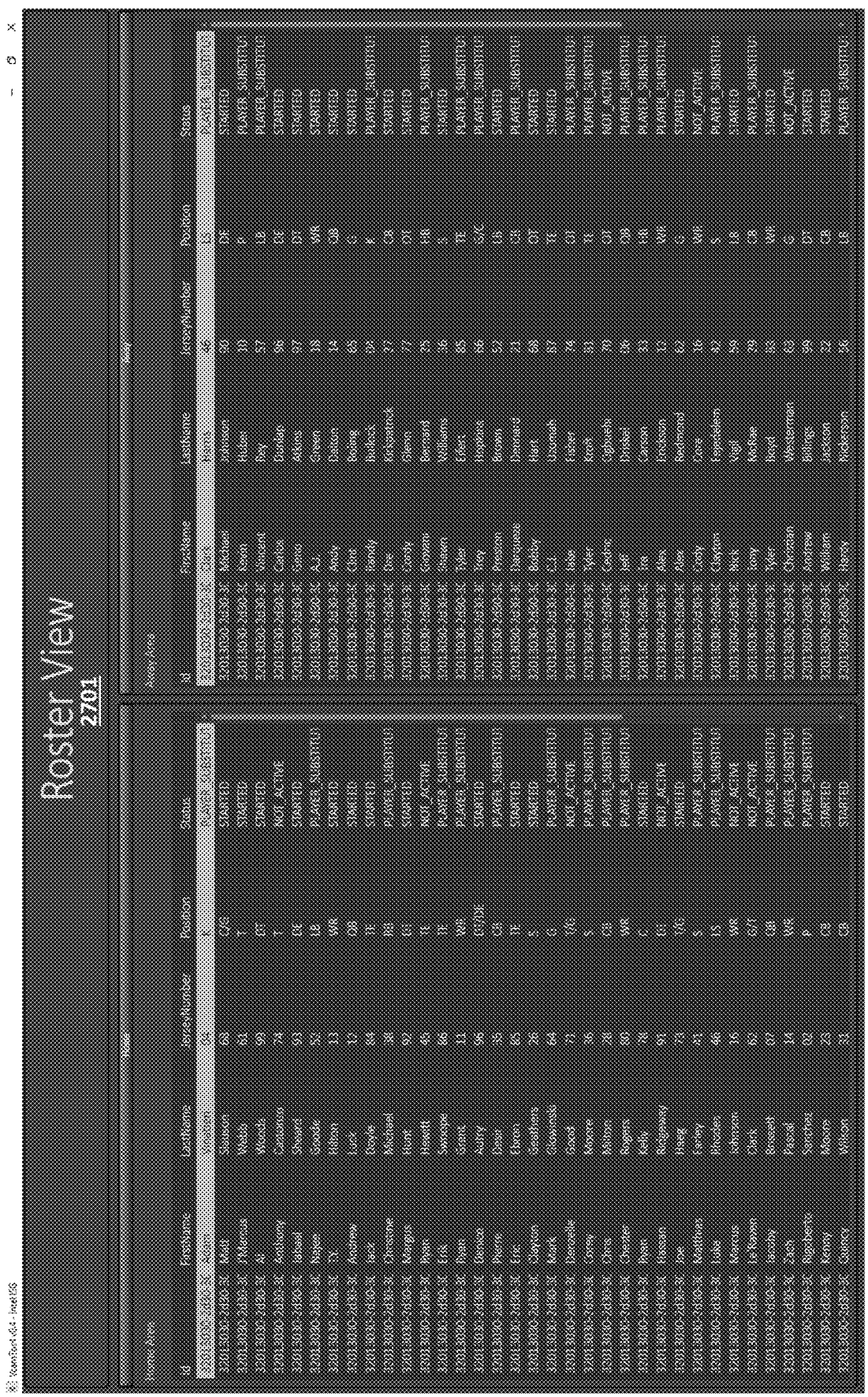
FIG. 27 illustrates a roster view employed by one embodiment of a graphical user interface.

The set of VCAMs identified as "Go-after-Player" VCAMs 2510, may be associated with specific players in a game. One particular mapping is shown in region 2615. The system may use image recognition techniques to identify each player's jersey number and/or team and may automatically associate each identified player with a VCAM 2510. In one embodiment, the user is provided with access, in real time, to the roster of players from the Home and Away teams and their current status/role in the current event. FIG. 27 illustrates an example of a Roster View 2701 comprising a listing of players with information such as position, first and last name, and number. This information may be associated with each go-after-player VCAM as metadata and displayed within the user interfaces in various ways as described herein.

Figure 28:
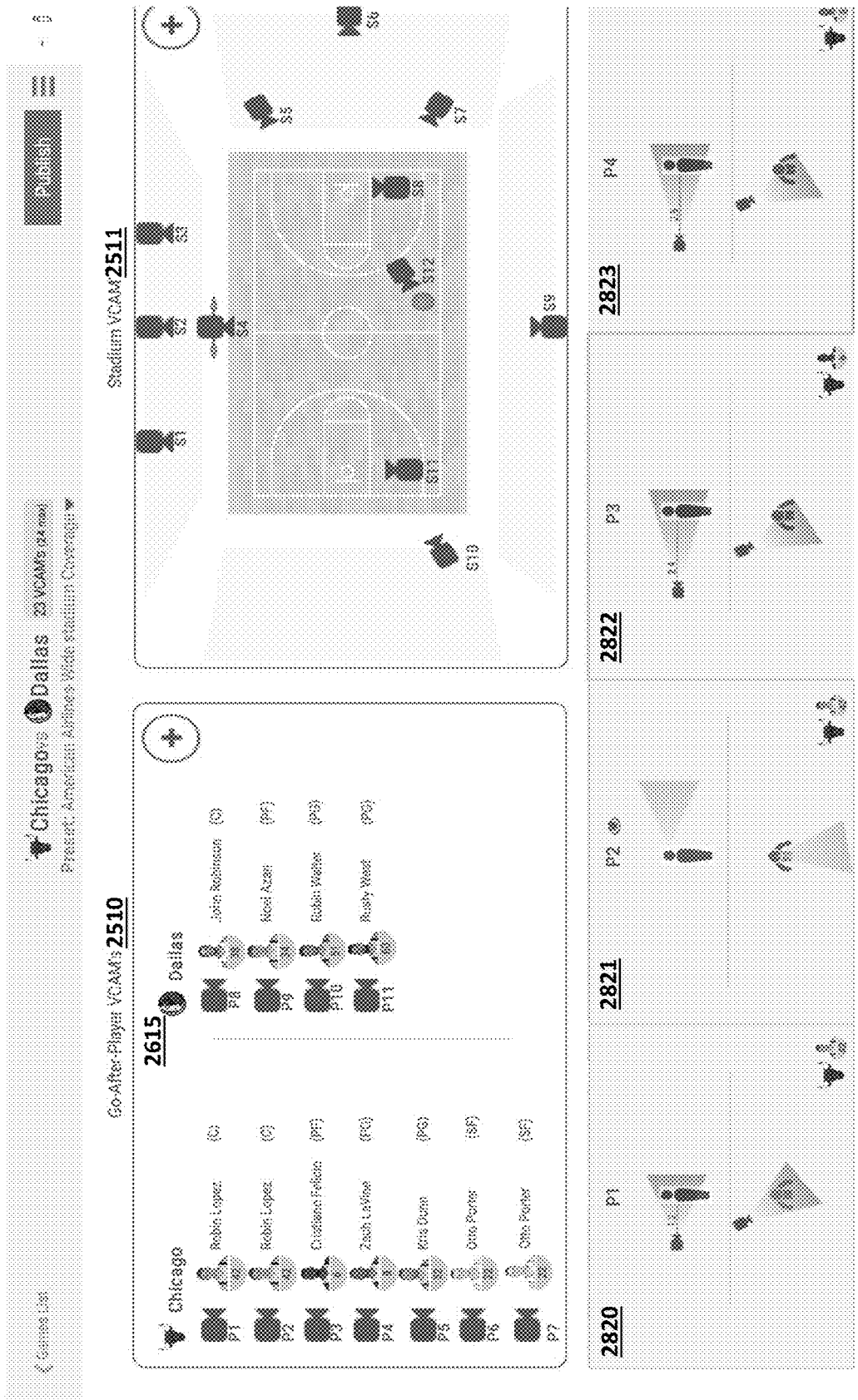
FIG. 28 illustrates virtual camera configurations including a virtual camera from the perspective of a player.

FIG. 28 illustrates a graphical user interface 2801 allowing the go-after-player VCAMs 2510 associated with different players (identified as P1, P2, P3, P4, etc) to be adjusted. As illustrated, a go-after-player VCAM can be pointed at the player (e.g., such as shown in regions 2820, 2822, 2823 for players P1, P3 and P4) or can be rendered from the point of view of the player (e.g., such as shown graphically in region 2821 for player P2). The configuration for each such VCAM is graphically shown using triangular projection and camera graphics in the lower pane. Thus, from the illustrated game screen GUI, the user can adjust how a Go-After-Player VCAM 2510 follows an associated target player.

Figure 29:
FIG. 29 illustrates a viewpoint from one embodiment of a virtual camera.

One embodiment of the invention includes a preview capability with a point-cloud video sequence of players superposed on a stadium 3D model. This embodiment is intended to help the user choose the most appropriate camera parameters for each location. FIG. 29 illustrates an example of a preview VCAM image 2901 using a point-cloud video sequence. In one embodiment, for fixed VCAMs, the user is provided with the option to set the initial camera position and orientation, to specify the speed at which the camera should move, and to determine how close the VCAM should be to the tracked target.

Figure 30:
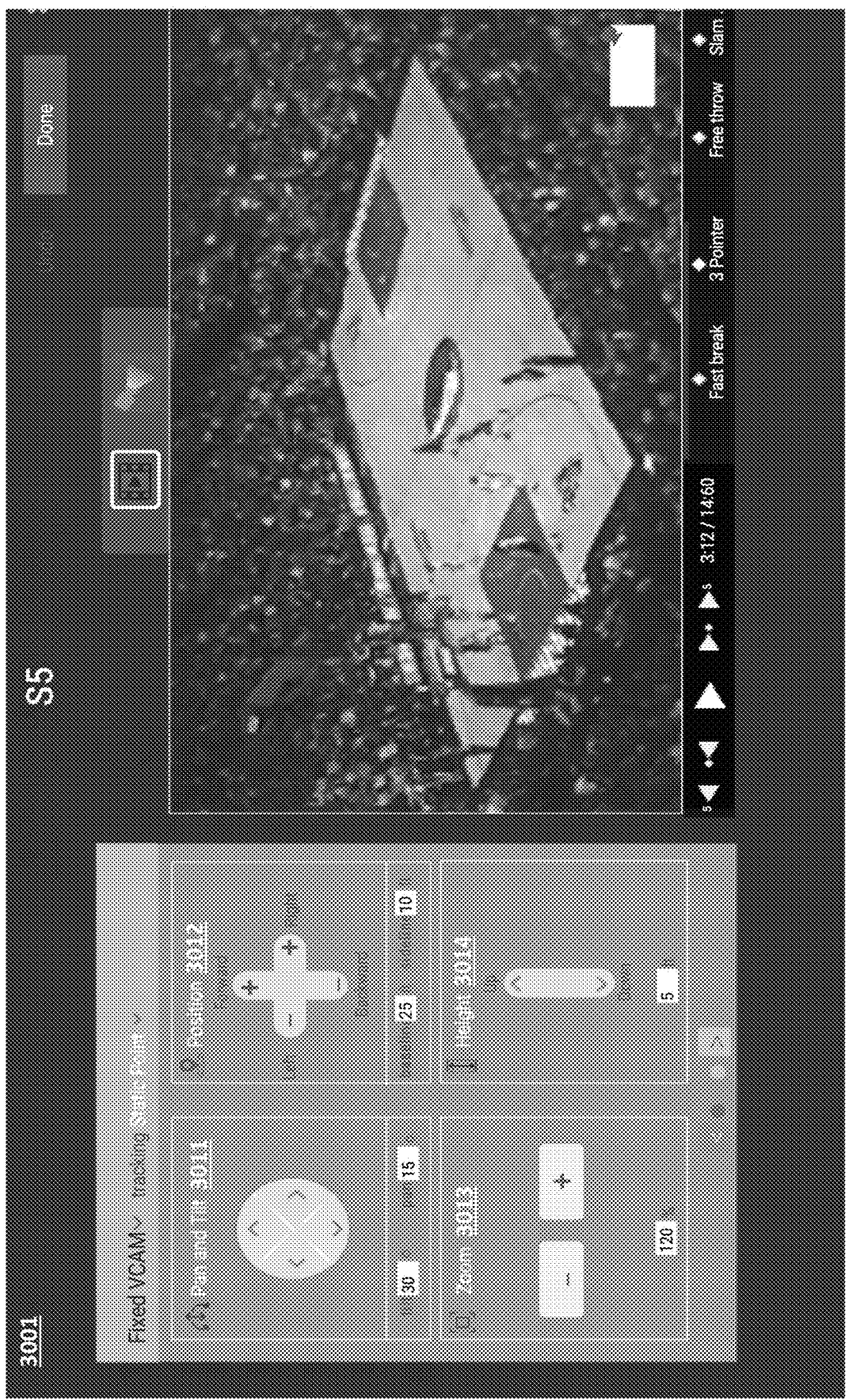
FIGS. 30-31 illustrate configuration settings for a virtual camera in accordance with one embodiment.

FIG. 30 illustrates one embodiment of a graphical user interface (GUI) 3001 for setting these parameters including a pan and tilt graphic 3011 with pan left and right elements and tilt up and down elements. Data fields are also provided to allow the user to manually enter values. A position graphic 3012 provides options for moving left, right, forward, and backward. In the illustrated example, the values are made relative to the baseline and sidelines. In addition, a zoom graphic 3013 provides options for zooming in and out in the video stream and a height graphic 3014 is provided to allow the user to increase or decrease the height of the camera.

In one embodiment, the ball is treated as just another target for the follow-target and follow-two-targets cameras described herein. In this implementation, the same tracking parameters apply to the player and ball targets (except for jersey number and team).

Figure 31:
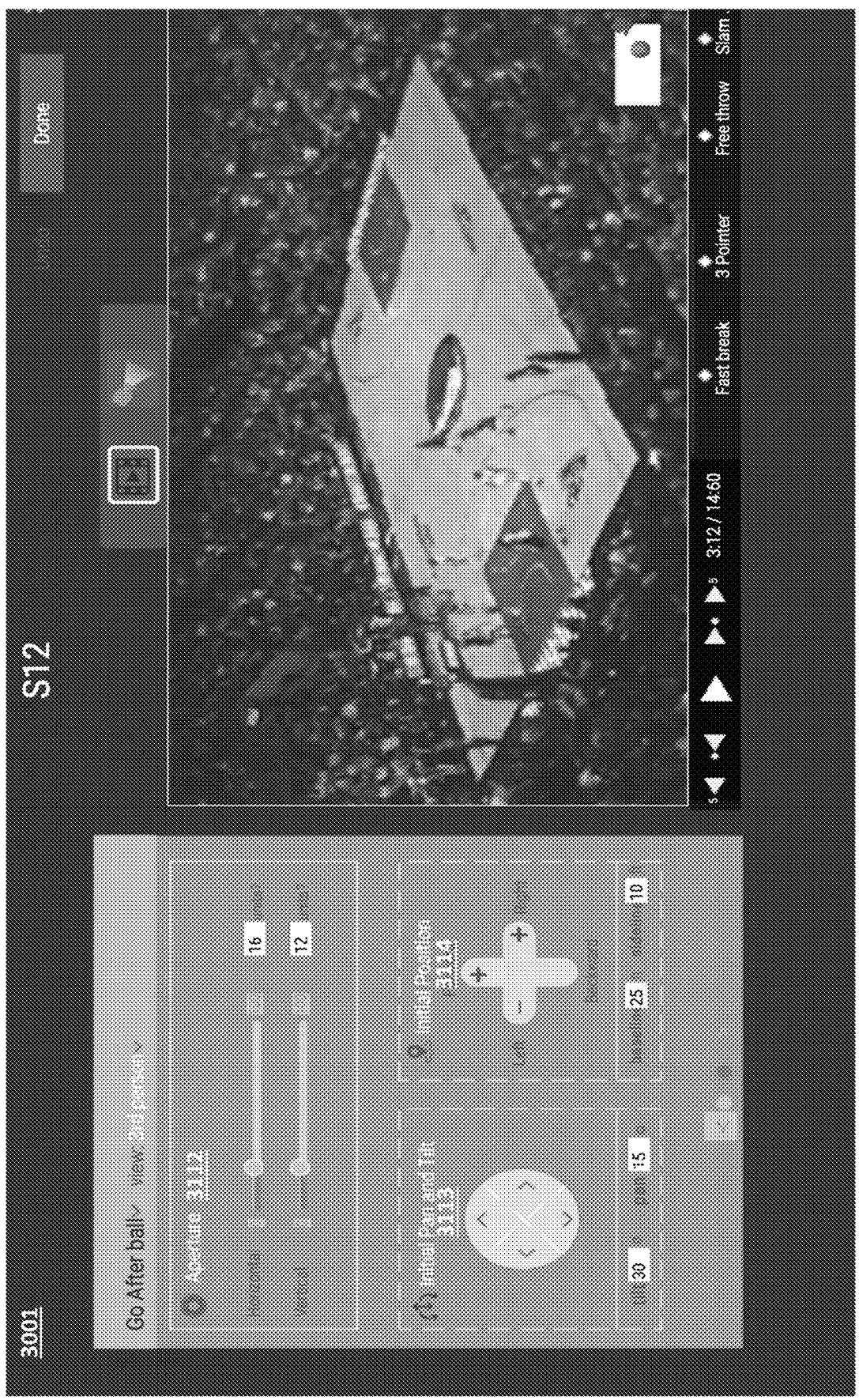

FIG. 31 illustrates one embodiment of a graphical user interface 3101 for setting these parameters including horizontal and vertical aperture values 3112, initial pan and tilt values 3113, and initial position values 1314.

Users will not want to reconfigure all camera parameters for each new game, particularly when a subsequent game will occur at the same event venue. As such, one embodiment allows previous VCAM and other configuration data to be saved and reused. In particular, VCAMs created on previously edited events (published or unpublished) are made available for reuse, reducing the editing time for a new event.

Figure 32:
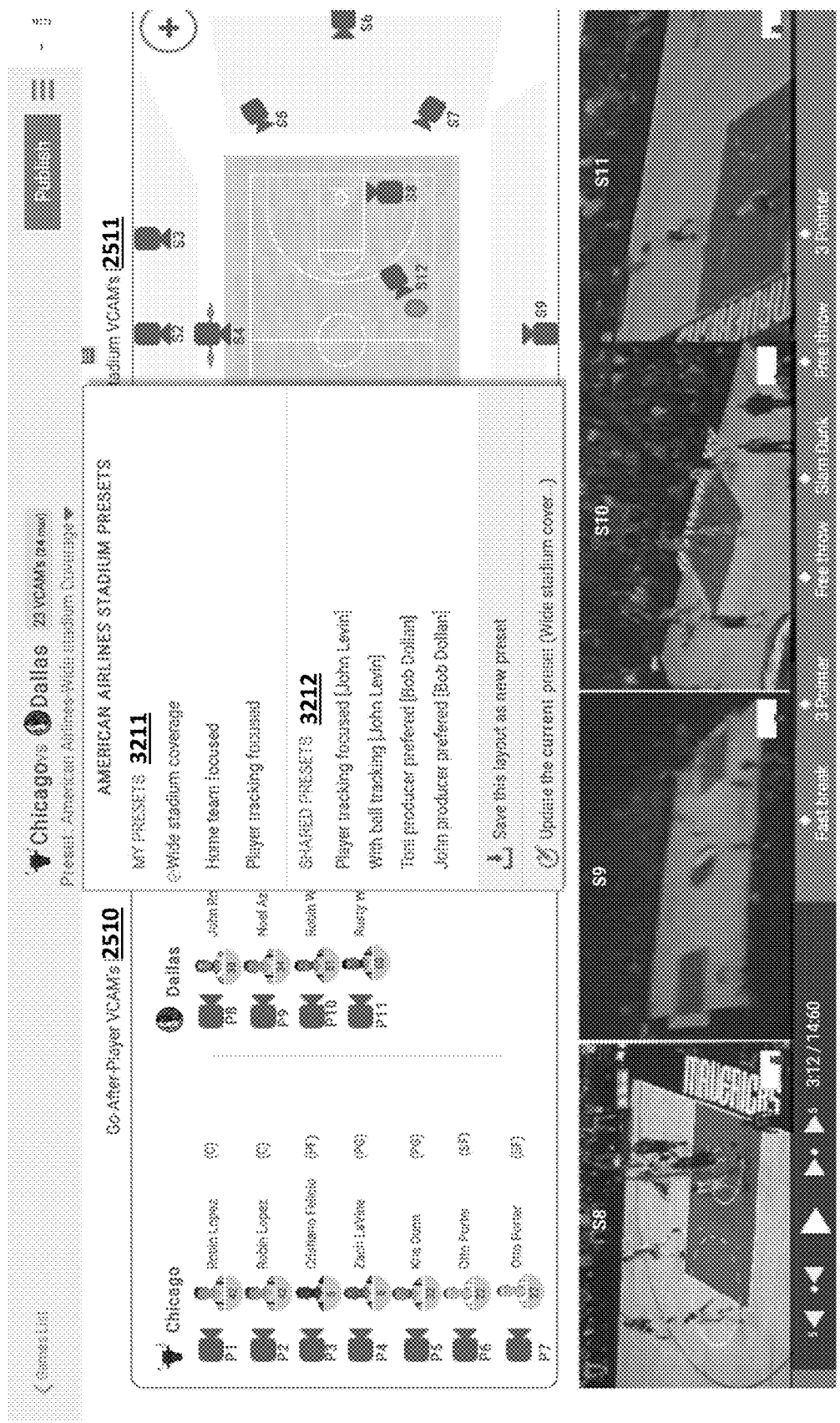
FIG. 32 illustrates additional configuration parameters including user presets and shared presets.

FIG. 32 illustrates one embodiment of a GUI 3201 in which VCAM and other configuration settings 3211 are associated with different preset categories such as wide stadium coverage, home team focused (i.e., ensuring that there will be greater emphasis on the home team's players), and player tracking focused (e.g., to direct more VCAM resources towards tracking individual players). Other presets include preferred settings of different producers and ball tracking presets 3212.

Figure 33:
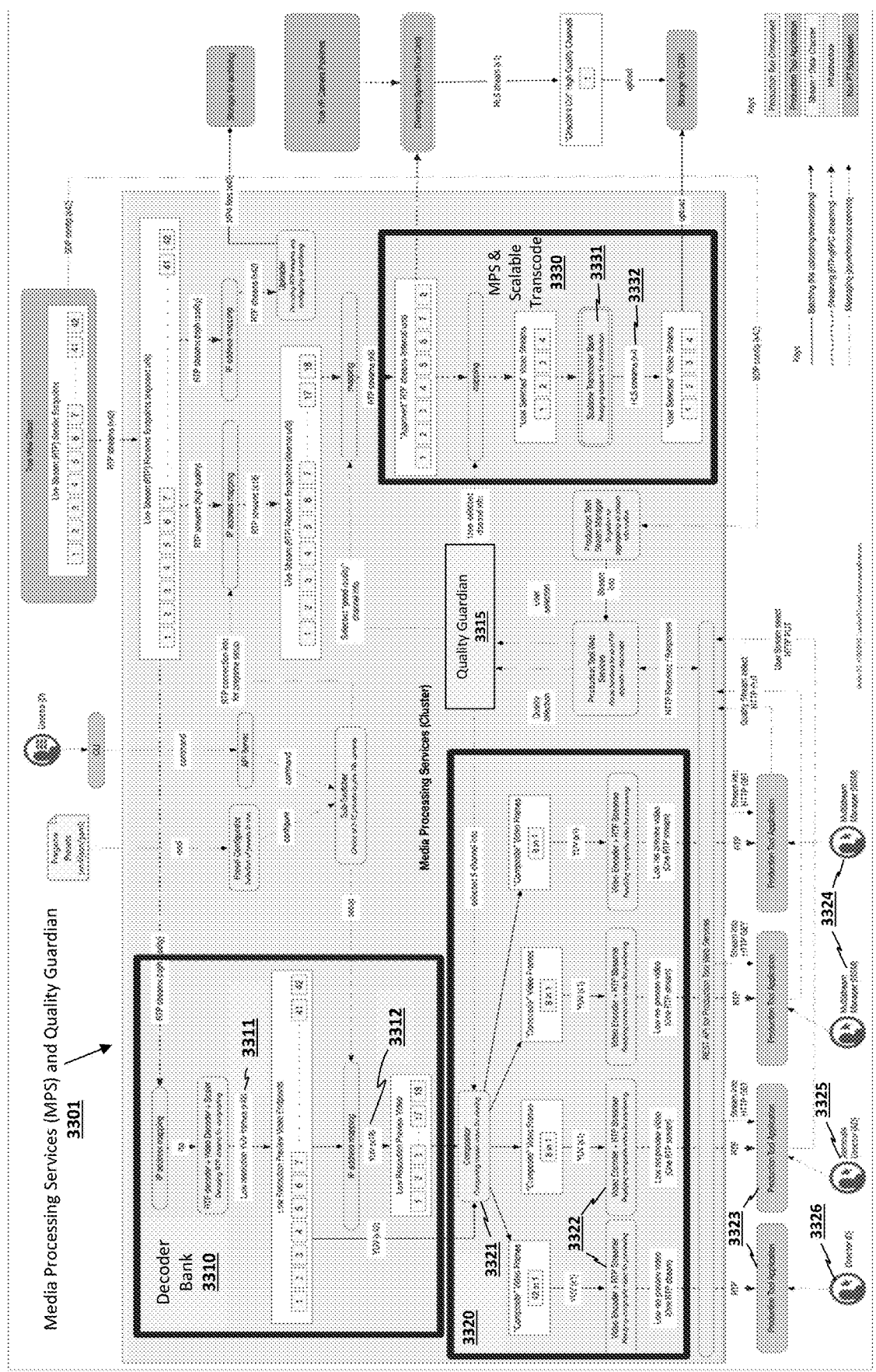
FIG. 33 illustrates an architecture of one embodiment including a quality guardian.

FIG. 33 illustrates an architecture for one embodiment of a media processing service (MPS) and quality guardian implementation. As mentioned, the quality guardian 3315 is a quality control tool implemented as a logical block within the system (e.g., on separate data processing hardware and/or as a separate process running on shared data processing hardware). Regardless of the implementation, the quality guardian 3315 is implemented as a module within the Media Processing Service (MPS) in a volumetric video cloud. One or more of the VCAM configuration presets mentioned above may be loaded into the quality guardian 3315 which operates to filter down 42 live streams into 18 live streams for the subsequent selection process.

In the specific implementation in FIG. 33, 42 live stream video feeds are provided from the event via a cloud-based live streaming system (some aspects of which are described above). A decoder bank 3310 decodes the 42 video streams and generates low resolution YUV frames 3311 for all 42 streams for viewing/processing by members of the video production team, which cull the 42 streams down to 18 streams 3312.

Compositing and encoding subsystem 3320 receives the low resolution streams or a subset thereof and includes a compositor 3321 which generates different sets of composite video frames for different video production users. In particular, the compositor 3321 composes different mosaic videos comprising selected groups of the low resolution preview streams 3312 for viewing by members of the video production team. The sets of composite video frames are then encoded and streamed by video encoders/RTP streamers 3322 and displayed within different instances of a production tool application 3323 (e.g., one operated by each user). In response to various user input via the production tool applications, sets of user-selected video streams comprising subsets of the video streams are provided via a production tool web services link connected to each of the production tool instances 3323.

A quality guardian instance 3315 coupled to the production tool web services implements video quality evaluation logic to identify a subset of "good quality" video streams. In one embodiment, the quality guardian 3315 implements one or more video quality metrics to rank the quality of the various video streams and may also accept user input from the production tool web services component.

In one embodiment, the selection of high quality live streams is conducted by two video production users of the Production Tool Application, each user identified in FIG. 33 as a Multistream Manager (MSM) 3324. In particular, each MSM 3324 may be presented with N live preview videos (e.g., 9 in the illustrated example) which are the low resolution version of the video streams. The two MSMs 3324 are tasked with choosing M good quality live streams out of 2N live preview videos presented. The choices of the MSMs is fed to the quality guardian block 3315 so the selected video streams are routed appropriately to the next subsystem. In one embodiment, 8 good quality live streams are selected from 18. However, the underlying principles of the invention are not limited to any particular set of live streams or good quality live streams.

In one embodiment, an Associate Director (AD) 3325 uses an instance of the production tool application to choose the next 4 streams from the 8 quality live streams selected by the MSMs 3324. These selections are provided to the MPS & scalable transcode subsystem 3330 which routes the 4 live streams (referred to here as the "User-Select" streams) to a scalable transcoder bank 3331 to generate four HTTP live streaming or "HLS" streams 3332. In one embodiment, the scalable transcoder bank 3331 performs encoding and multiplexing, using an output format which is ready for storage on a content distribution network (CDN). These streams may be further filtered into a single HLS stream by the director 3326 or associate director 3325 through respective instances of the production tool application 3323.

Figure 34:
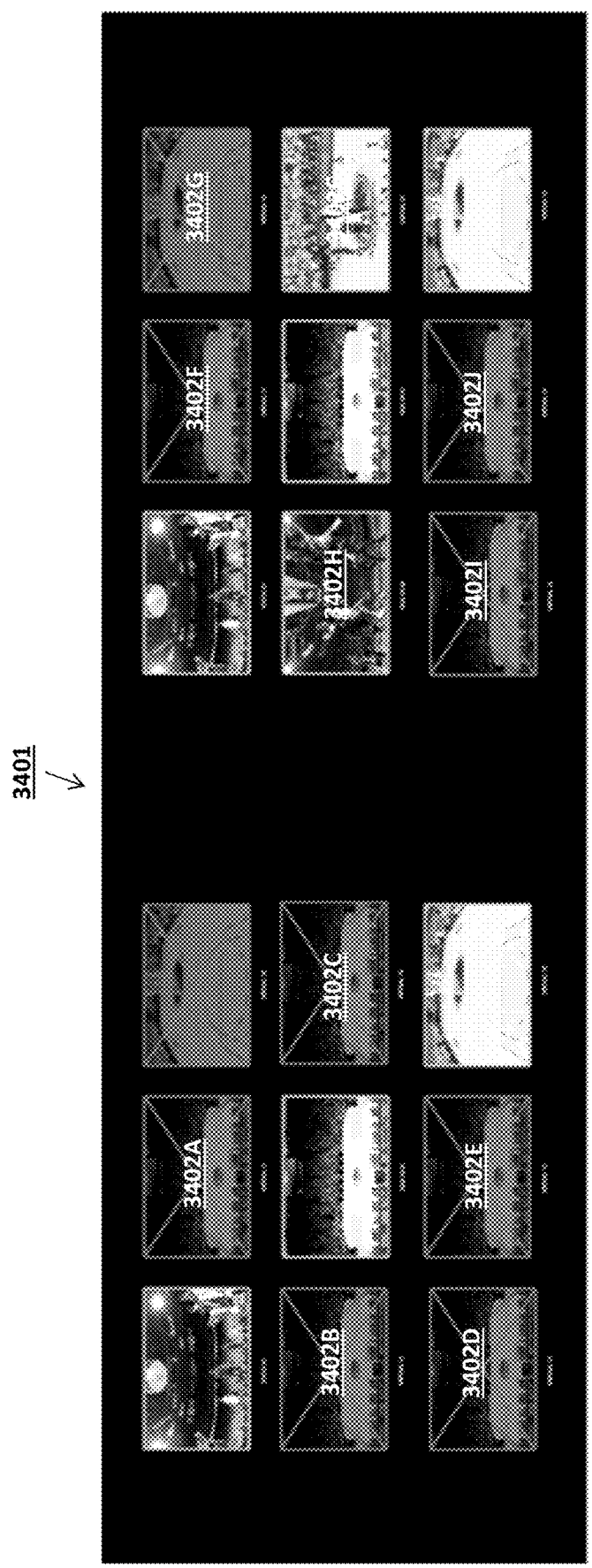
FIG. 34 illustrates one embodiment of a graphical user interface for selecting video streams.

In one embodiment, a graphical user interface (GUI) 3401 such as shown in FIG. 34 is used by the different production team members 324-3326 at the various stages described above to identify the a subset of video streams to be passed to the next level. In this example, a user may select a video frame associated with a video stream to cause it to be deleted from the final set, resulting in a graphic (e.g., an X) indicating that the video stream has been removed, as indicated for video streams 3402A-J. The remaining streams are passed on to the next stage.

Figure 35:
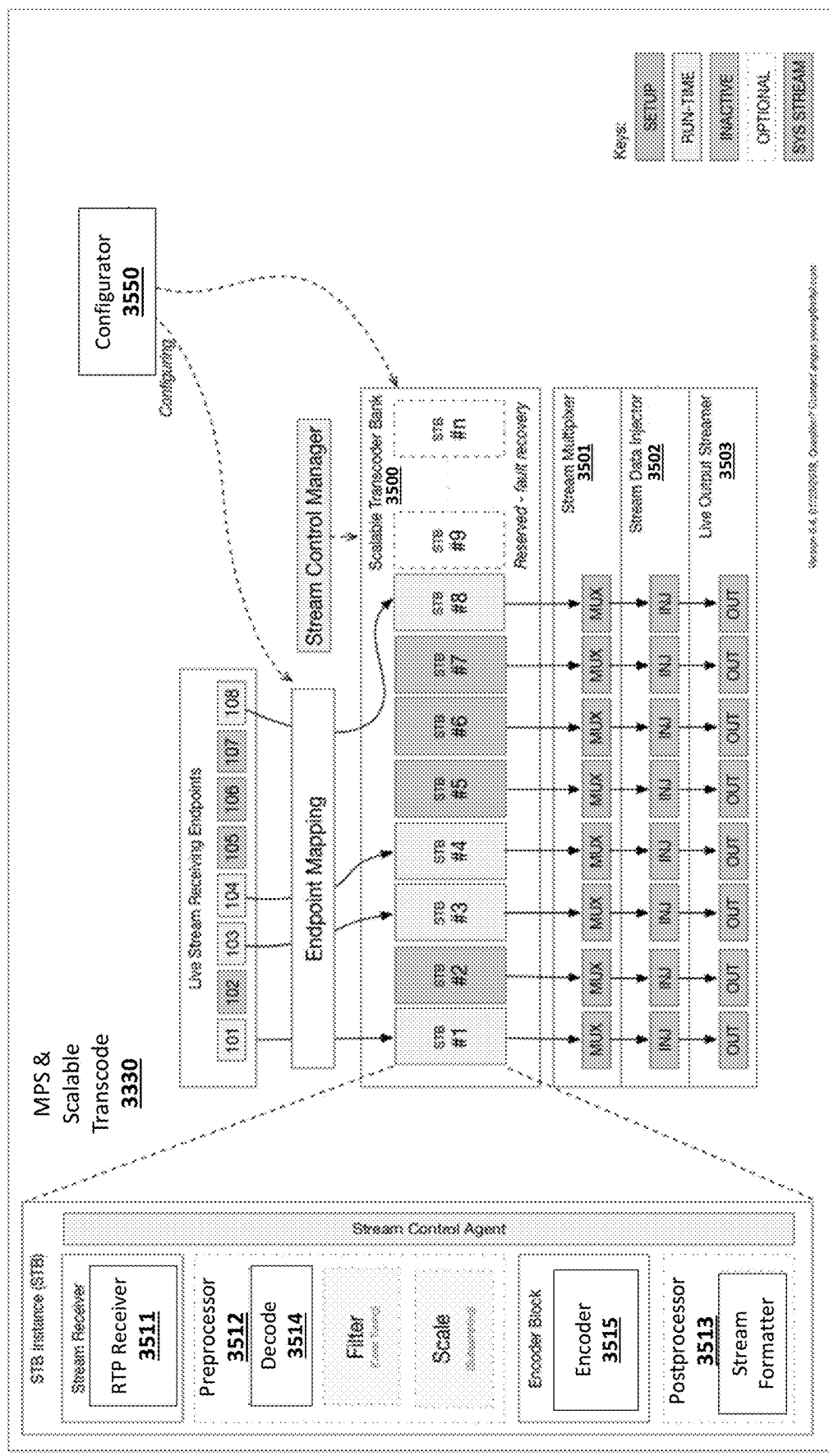
FIGS. 35-36 illustrate embodiments of a scalable transcoder bank.

FIG. 35 illustrates additional details of one embodiment of the media processing service with scalable transcoder bank 3330. In one embodiment, each instance of the scalable transcoder bank (STB) 3500 (details of one instance are shown) includes an RTP receiver 3511 and a pre-processor 3512 with a decoder 3514 for decoding a corresponding stream in accordance with a particular video format (e.g., H.264). In addition, the pre-processor may include a filter for color tuning and other operations and a scaling block (e.g., to perform sub-sampling). An encoder 3515 re-encodes the selected video streams using a different format and/or different encoding parameters. A postprocessor 3513 performs one or more stream formatting operations as described herein. Each STB instance includes a stream control agent to manage the various processing stages.

The four streams (highlighted with a different shades of grey in FIG. 35) are selected by a stream multiplexer unit 3501. Various types of metadata associated with the streams are injected by a stream data injector 3502 (e.g., the identity of a player highlighted in the stream, the current score, etc). A live output streamer 3503 then generates a playlist with a set of media segments for each of the four selected streams. The results may then be transmitted to a content delivery network (CDN) and made available to end users or further filtered by the director as described above. A configurator module 3550 configures of any of the various processing stages described herein in response to user input.

Figure 36:
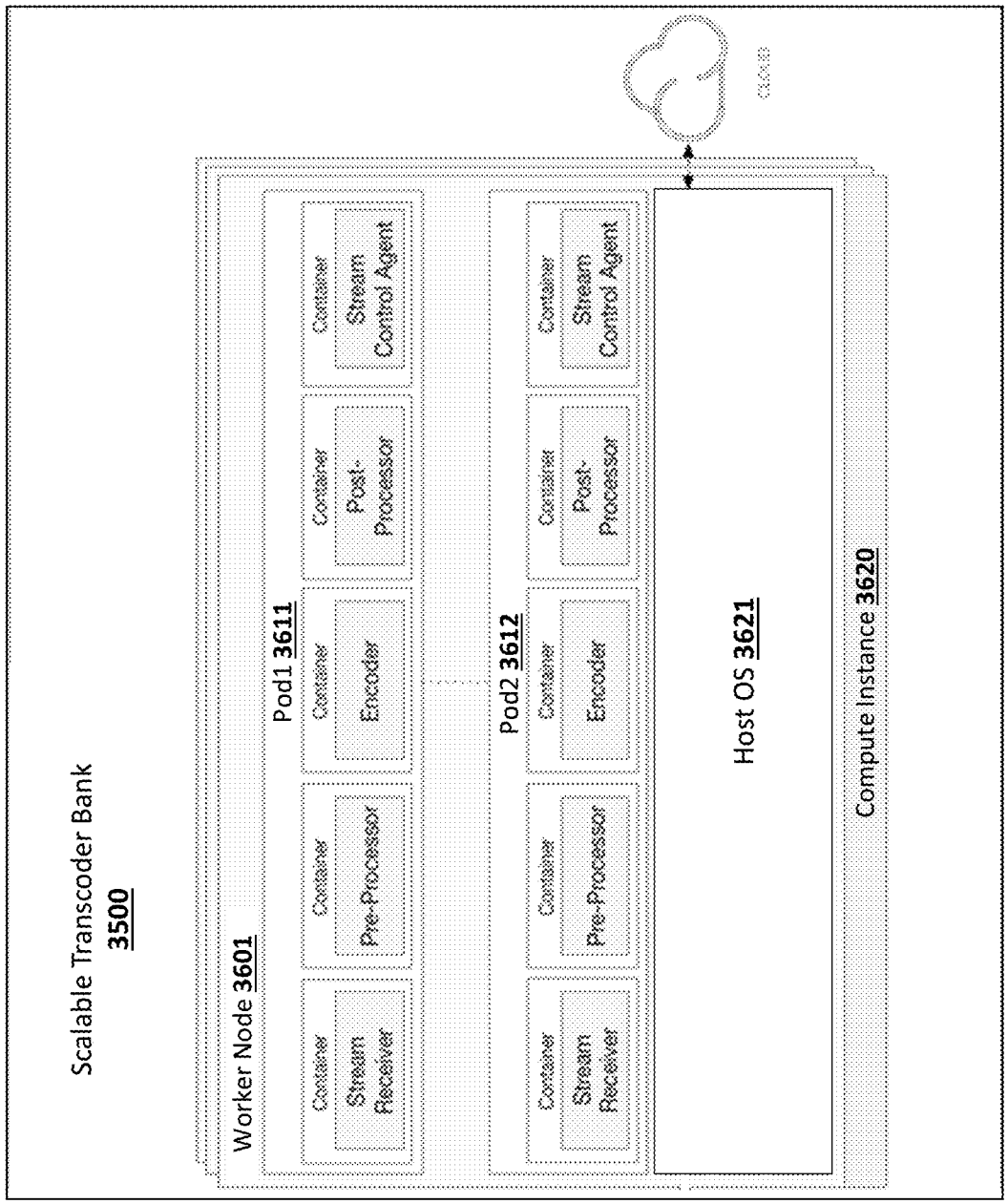

FIG. 36 illustrates additional details of one embodiment of the media processing service with scalable transcoder bank 3330. Here, a scalable transcoder bank 3500 is implemented as a set of one or more worker nodes 3601 comprising a plurality of containers 3611-3612 for performing the above operations (e.g., a stream receiver, pre-processor, encoder, post-processor, and stream control agent as described above). The worker nodes 3601 are executed on top of one or more compute instances 3620 (e.g., EC2 AWS instances) and using a specified Host operating system (OS) 3621.

Figure 37:
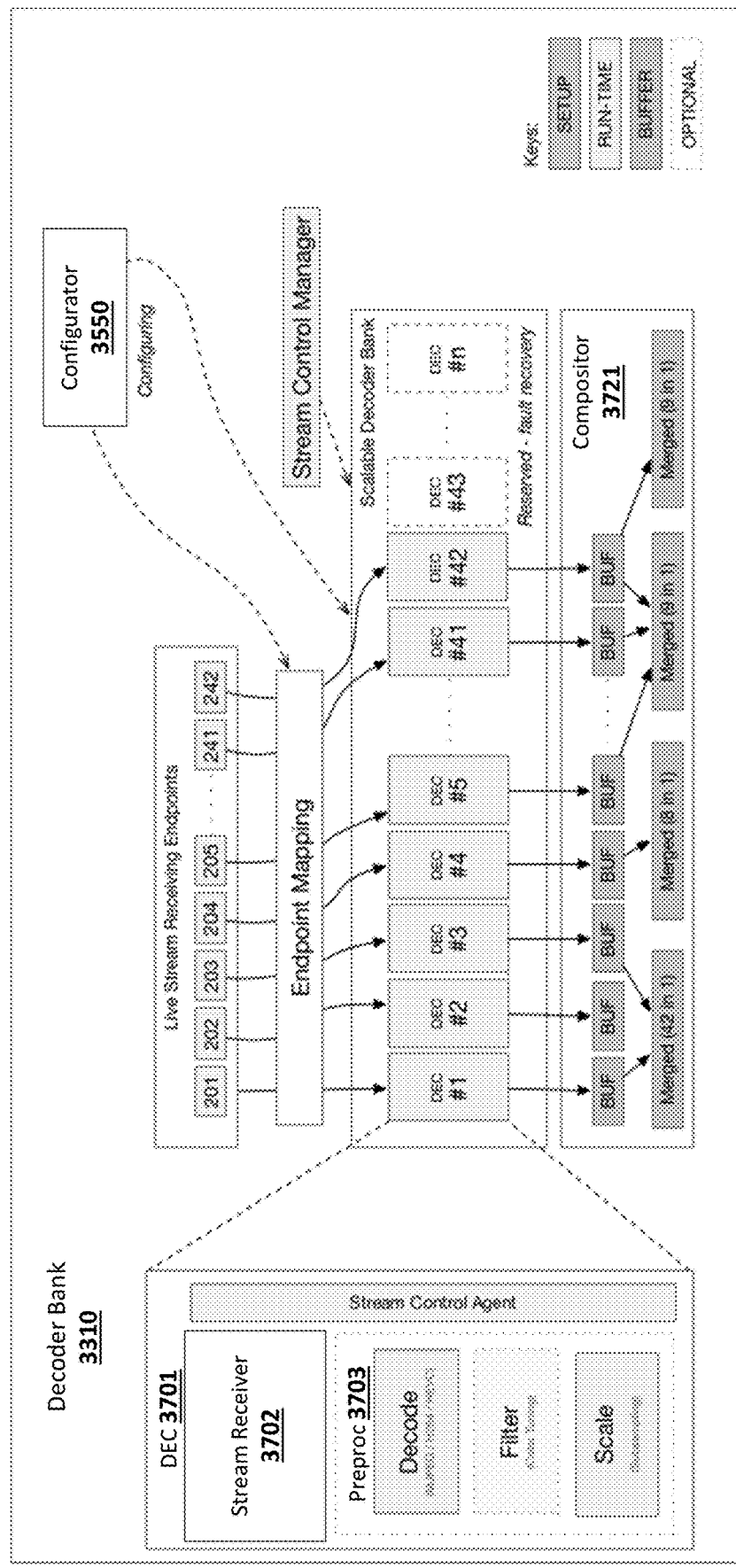
FIG. 37 illustrates one embodiment of a decoder bank.

FIG. 37 illustrates additional details of one embodiment of the scalable decoder bank 3310 which includes a plurality of decoding instances (one for each stream) 3701. As illustrated, each decoding instance includes a stream receiver 3702 for receiving a specified RTP stream and a pre-processor 3703 with a decoder for decoding a corresponding stream in accordance with a particular video format (e.g., H.264). In addition, the pre-processor 3703 may include a filter to perform color tuning and a scaling module for subsampling the corresponding stream.

The compositor component 3721 includes a series of buffers for storing video frames from each of the decoded streams. In response to selections made by the various users, the compositor merges specified subsets of the frames, selecting the relevant frames from each buffer.

Figure 38:
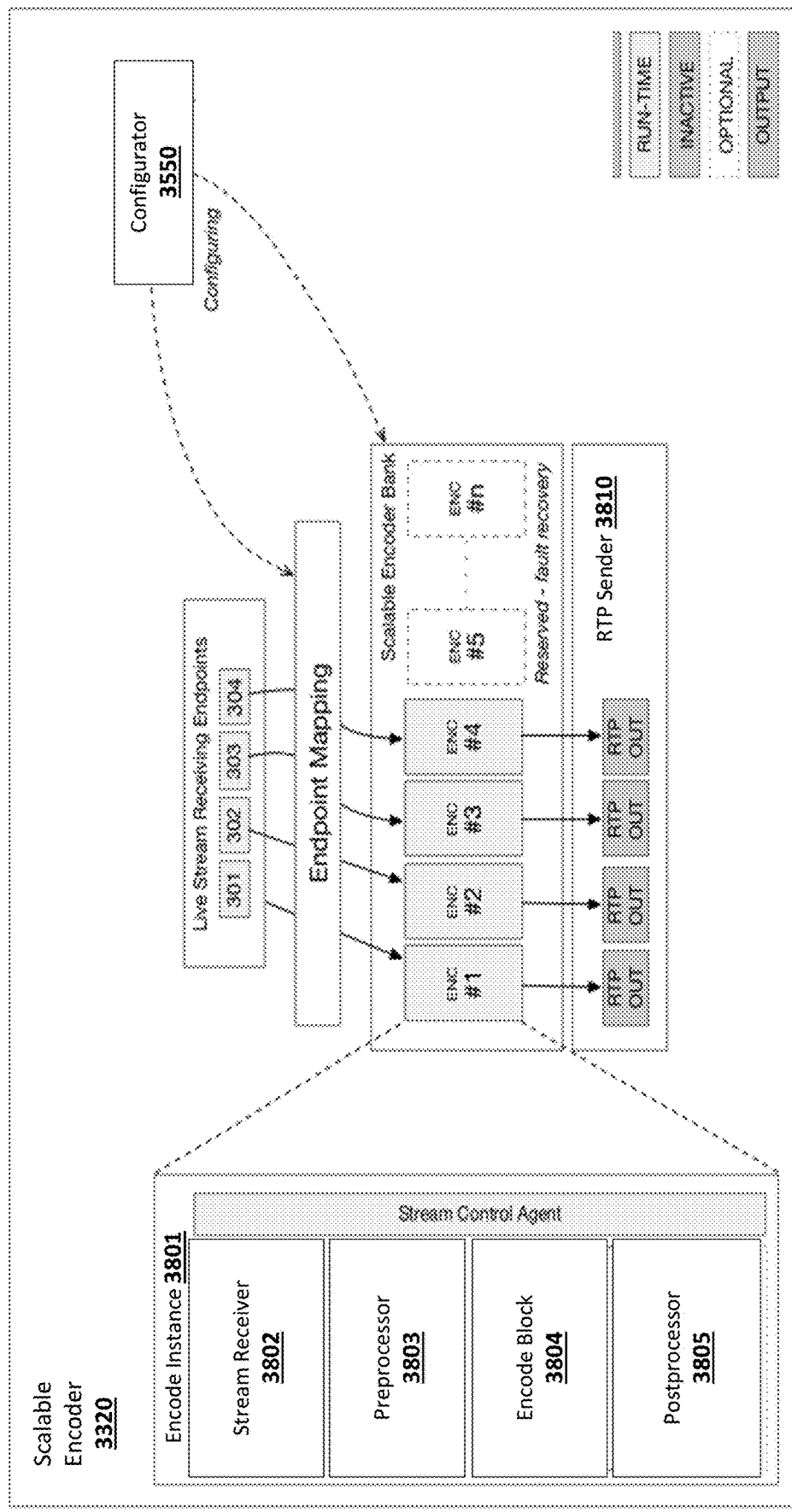
FIG. 38 illustrates one embodiment of a scalable encoder.

FIG. 38 illustrates additional details of one embodiment of the scalable encoder 3320 which includes a plurality of encoding instances 3801, each of which encodes one of the streams. A stream receiver 3802 receives a YUV stream from the decoder bank 3310 and an encoder 3804 encodes the stream in accordance with a specified protocol (e.g., HEVC/H.264). A pre-processor 3803 with a filter may perform additional color tuning and a post-processor 3805 with a stream formatter may perform one or more additional post-processing operations on each respective video stream. Finally, an RTP sender formats and transmits the video streams in accordance with RTP.

EXAMPLES

The following are example implementations of different embodiments of the invention.

Example 1

A system comprising: a decode subsystem comprising circuitry to concurrently decode a plurality of video streams captured by cameras at an event to generate decoded video streams from a perspective of corresponding virtual cameras (VCAMs); video evaluation logic to apply at least one video quality metric to determine a quality value for the decoded video streams or a subset thereof, and to rank the decoded video streams based, at least in part, on the quality values associated with the decoded video streams; preview logic to provide the decoded video streams or modified versions thereof to one or more computing devices accessible to one or more video production team members and to further provide the quality values and/or the rank generated by the video quality evaluation logic; stream selection hardware logic to select a subset of the plurality of decoded video streams based on input from the one or more video production team members; and transcoder hardware logic to transcode the subset of the plurality of decoded video streams for live transmission over a public or private network.

Example 2

The system of example 1 wherein the decode subsystem comprises a parallel decoder bank comprising a number of decoders equal to or greater than a number of the plurality of video streams.

Example 3

The system of example 1 wherein the video evaluation logic operates in accordance with virtual camera (VCAM) configuration data associated with a plurality of VCAMs, the VCAM configuration data specifying configurations for virtual cameras configured by one of the video production team members, wherein the video evaluation logic is to filter out a first subset of the video streams from further processing based, at least in part, on the VCAM configuration data, allowing further processing of a second subset of the video streams.

Example 4

The system of example 3 wherein the preview logic includes a program code specifying a graphical user interface (GUI) to be presented to the one or more video production team members, the GUI presenting a video production team member with a stream selection window comprising a plurality of video tiles or graphical representations corresponding to the second subset of the video streams, the GUI providing a selection graphic to visually differentiate video streams of the second subset which are selected from those which are not selected.

Example 5

The system of example 4 wherein the GUI further comprises a virtual camera configuration window comprising a plurality of selectable camera graphic elements corresponding to the plurality of VCAMs, wherein a VCAM is to generate a video stream from a perspective indicated by a corresponding camera graphic element.

Example 6

The system of example 5 wherein the virtual camera configuration window comprises a first mapping region to associate a first subset of the camera graphic elements with a corresponding plurality of player graphic elements representing players in a sporting event, wherein a first VCAM associated with a first camera graphic element is to generate a video stream from a perspective of a first player associated with an associated camera graphic element.

Example 7

The system of example 6 wherein the virtual camera configuration window further comprises a second mapping region to associate a second subset of the camera graphic elements with locations on or around a graphical representation of a region of play for a sporting event, wherein a second VCAM associated with a second camera graphic element from the second subset is to generate a video stream from a perspective indicated in the second mapping region.

Example 8

The system of example 1 further comprising: metadata insertion logic to inject metadata associated with a player or team into one or more of the subset of the plurality of video streams for live transmission over a public or private network, the metadata to be decoded and presented on client devices of one or more end users.

Example 9

A method comprising: concurrently decoding a plurality of video streams captured by cameras at an event to generate decoded video streams from a perspective of corresponding virtual cameras (VCAMs); applying at least one video quality metric to determine a quality value for the decoded video streams or a subset thereof, and to rank the decoded video streams based, at least in part, on the quality values associated with the decoded video streams; providing the decoded video streams or modified versions thereof to one or more computing devices accessible to one or more video production team members and to further provide the quality values and/or the rank generated by the video quality evaluation logic; selecting a subset of the plurality of decoded video streams based on input from the one or more video production team members; and transcoding the subset of the plurality of decoded video streams for live transmission over a public or private network.

Example 10

The method of example 9 wherein concurrently decoding is performed with a parallel decoder bank comprising a number of decoders equal to or greater than a number of the plurality of video streams.

Example 11

The method of example 9 further comprising: interpreting virtual camera (VCAM) configuration data associated with a plurality of VCAMs, the VCAM configuration data specifying configurations for virtual cameras configured by one of the video production team members, wherein the a first subset of the video streams are to be filtered out from further processing based, at least in part, on the VCAM configuration data, allowing further processing of a second subset of the video streams.

Example 12

The method of example 11 further comprising: executing program code to present a graphical user interface (GUI) to the one or more video production team members, the GUI presenting a video production team member with a stream selection window comprising a plurality of video tiles or graphical representations corresponding to the second subset of the video streams, the GUI providing a selection graphic to visually differentiate video streams of the second subset which are selected from those which are not selected.

Example 13

The method of example 12 wherein the GUI further comprises a virtual camera configuration window comprising a plurality of selectable camera graphic elements corresponding to the plurality of VCAMs, wherein a VCAM is to generate a video stream from a perspective indicated by a corresponding camera graphic element.

Example 14

The method of example 13 wherein the virtual camera configuration window comprises a first mapping region to associate a first subset of the camera graphic elements with a corresponding plurality of player graphic elements representing players in a sporting event, wherein a first VCAM associated with a first camera graphic element is to generate a video stream from a perspective of a first player associated with an associated camera graphic element.

Example 15

The method of example 14 wherein the virtual camera configuration window further comprises a second mapping region to associate a second subset of the camera graphic elements with locations on or around a graphical representation of a region of play for a sporting event, wherein a second VCAM associated with a second camera graphic element from the second subset is to generate a video stream from a perspective indicated in the second mapping region.

Example 16

The method of example 9 further comprising: injecting metadata associated with a player or team into one or more of the subset of the plurality of video streams for live transmission over a public or private network, the metadata to be decoded and presented on client devices of one or more end users.

Example 17

A machine-readable medium having program code stored thereon which, when executed by a machine, causes the machine to perform the operations of: concurrently decoding a plurality of video streams captured by cameras at an event to generate decoded video streams from a perspective of corresponding virtual cameras (VCAMs); applying at least one video quality metric to determine a quality value for the decoded video streams or a subset thereof, and to rank the decoded video streams based, at least in part, on the quality values associated with the decoded video streams; providing the decoded video streams or modified versions thereof to one or more computing devices accessible to one or more video production team members and to further provide the quality values and/or the rank generated by the video quality evaluation logic; selecting a subset of the plurality of decoded video streams based on input from the one or more video production team members; and transcoding the subset of the plurality of decoded video streams for live transmission over a public or private network.

Example 18

The machine-readable medium of example 17 wherein concurrently decoding is performed with a parallel decoder bank comprising a number of decoders equal to or greater than a number of the plurality of video streams.

Example 19

The machine-readable medium of example 17 further comprising program code to cause the machine to perform the operations of: interpreting virtual camera (VCAM) configuration data associated with a plurality of VCAMs, the VCAM configuration data specifying configurations for virtual cameras configured by one of the video production team members, wherein the a first subset of the video streams are to be filtered out from further processing based, at least in part, on the VCAM configuration data, allowing further processing of a second subset of the video streams.

Example 20

The machine-readable medium of example 19 further comprising program code to cause the machine to perform the operations of: executing program code to present a graphical user interface (GUI) to the one or more video production team members, the GUI presenting a video production team member with a stream selection window comprising a plurality of video tiles or graphical representations corresponding to the second subset of the video streams, the GUI providing a selection graphic to visually differentiate video streams of the second subset which are selected from those which are not selected.

Example 21

The machine-readable medium of example 20 wherein the GUI further comprises a virtual camera configuration window comprising a plurality of selectable camera graphic elements corresponding to the plurality of VCAMs, wherein a VCAM is to generate a video stream from a perspective indicated by a corresponding camera graphic element.

Example 22

The machine-readable medium of example 21 wherein the virtual camera configuration window comprises a first mapping region to associate a first subset of the camera graphic elements with a corresponding plurality of player graphic elements representing players in a sporting event, wherein a first VCAM associated with a first camera graphic element is to generate a video stream from a perspective of a first player associated with an associated camera graphic element.

Example 23

The machine-readable medium of example 22 wherein the virtual camera configuration window further comprises a second mapping region to associate a second subset of the camera graphic elements with locations on or around a graphical representation of a region of play for a sporting event, wherein a second VCAM associated with a second camera graphic element from the second subset is to generate a video stream from a perspective indicated in the second mapping region.

Example 24

The machine-readable medium of example 17 further comprising program code to cause the machine to perform the operations of: injecting metadata associated with a player or team into one or more of the subset of the plurality of video streams for live transmission over a public or private network, the metadata to be decoded and presented on client devices of one or more end users.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. A system comprising:
a decode subsystem comprising circuitry to concurrently decode a plurality of video streams captured by cameras at an event to generate decoded video streams from a perspective of corresponding virtual cameras (VCAMs);
video evaluation logic to apply at least one video quality metric to determine a quality value for the decoded video streams or a subset thereof, and to rank the decoded video streams based, at least in part, on the quality values associated with the decoded video streams;
preview logic to provide the decoded video streams or modified versions thereof to one or more computing devices accessible to one or more video production team members and to further provide the quality values and/or the rank generated by the video evaluation logic;
stream selection hardware logic to select a subset of the plurality of decoded video streams based on input from the one or more video production team members; and
transcoder hardware logic to transcode the subset of the plurality of decoded video streams for live transmission over a public or private network.

2. The system of claim 1 wherein the decode subsystem comprises a parallel decoder bank comprising a number of decoders equal to or greater than a number of the plurality of video streams.

3. The system of claim 1 wherein the video evaluation logic operates in accordance with virtual camera (VCAM) configuration data associated with a plurality of VCAMs, the VCAM configuration data specifying configurations for virtual cameras configured by one of the video production team members, wherein the video evaluation logic is to filter out a first subset of the video streams from further processing based, at least in part, on the VCAM configuration data, allowing further processing of a second subset of the video streams.

4. The system of claim 3 wherein the preview logic includes a program code specifying a graphical user interface (GUI) to be presented to the one or more video production team members, the GUI presenting a video production team member with a stream selection window comprising a plurality of video tiles or graphical representations corresponding to the second subset of the video streams, the GUI providing a selection graphic to visually differentiate video streams of the second subset which are selected from those which are not selected.

5. The system of claim 4 wherein the GUI further comprises a virtual camera configuration window comprising a plurality of selectable camera graphic elements corresponding to the plurality of VCAMs, wherein a VCAM is to generate a video stream from a perspective indicated by a corresponding camera graphic element.

6. The system of claim 5 wherein the virtual camera configuration window comprises a first mapping region to associate a first subset of the camera graphic elements with a corresponding plurality of player graphic elements representing players in a sporting event, wherein a first VCAM associated with a first camera graphic element is to generate a video stream from a perspective of a first player associated with an associated camera graphic element.

7. The system of claim 6 wherein the virtual camera configuration window further comprises a second mapping region to associate a second subset of the camera graphic elements with locations on or around a graphical representation of a region of play for a sporting event, wherein a second VCAM associated with a second camera graphic element from the second subset is to generate a video stream from a perspective indicated in the second mapping region.

8. The system of claim 1 further comprising:
metadata insertion logic to inject metadata associated with a player or team into one or more of the subset of the plurality of video streams for live transmission over a public or private network, the metadata to be decoded and presented on client devices of one or more end users.

9. A method comprising:
concurrently decoding a plurality of video streams captured by cameras at an event to generate decoded video streams from a perspective of corresponding virtual cameras (VCAMs);
applying at least one video quality metric to determine a quality value for the decoded video streams or a subset thereof, and to rank the decoded video streams based, at least in part, on the quality values associated with the decoded video streams;
providing the decoded video streams or modified versions thereof to one or more computing devices accessible to one or more video production team members and to further provide the quality values and/or the rank;
selecting a subset of the plurality of decoded video streams based on input from the one or more video production team members; and
transcoding the subset of the plurality of decoded video streams for live transmission over a public or private network.

10. The method of claim 9 wherein concurrently decoding is performed with a parallel decoder bank comprising a number of decoders equal to or greater than a number of the plurality of video streams.

11. The method of claim 9 further comprising:
interpreting virtual camera (VCAM) configuration data associated with a plurality of VCAMs, the VCAM configuration data specifying configurations for virtual cameras configured by one of the video production team members,
wherein a first subset of the video streams are to be filtered out from further processing based, at least in part, on the VCAM configuration data, allowing further processing of a second subset of the video streams.

12. The method of claim 11 further comprising:
executing program code to present a graphical user interface (GUI) to the one or more video production team members, the GUI presenting a video production team member with a stream selection window comprising a plurality of video tiles or graphical representations corresponding to the second subset of the video streams, the GUI providing a selection graphic to visually differentiate video streams of the second subset which are selected from those which are not selected.

13. The method of claim 12 wherein the GUI further comprises a virtual camera configuration window comprising a plurality of selectable camera graphic elements corresponding to the plurality of VCAMs, wherein a VCAM is to generate a video stream from a perspective indicated by a corresponding camera graphic element.

14. The method of claim 13 wherein the virtual camera configuration window comprises a first mapping region to associate a first subset of the camera graphic elements with a corresponding plurality of player graphic elements representing players in a sporting event, wherein a first VCAM associated with a first camera graphic element is to generate a video stream from a perspective of a first player associated with an associated camera graphic element.

15. The method of claim 14 wherein the virtual camera configuration window further comprises a second mapping region to associate a second subset of the camera graphic elements with locations on or around a graphical representation of a region of play for a sporting event, wherein a second VCAM associated with a second camera graphic element from the second subset is to generate a video stream from a perspective indicated in the second mapping region.

16. The method of claim 9 further comprising:
injecting metadata associated with a player or team into one or more of the subset of the plurality of video streams for live transmission over a public or private network, the metadata to be decoded and presented on client devices of one or more end users.

17. A non-transitory machine-readable medium having program code stored thereon which, when executed by a machine, causes the machine to perform the operations of:
concurrently decoding a plurality of video streams captured by cameras at an event to generate decoded video streams from a perspective of corresponding virtual cameras (VCAMs);
applying at least one video quality metric to determine a quality value for the decoded video streams or a subset thereof, and to rank the decoded video streams based, at least in part, on the quality values associated with the decoded video streams;
providing the decoded video streams or modified versions thereof to one or more computing devices accessible to one or more video production team members and to further provide the quality values and/or the rank;
selecting a subset of the plurality of decoded video streams based on input from the one or more video production team members; and
transcoding the subset of the plurality of decoded video streams for live transmission over a public or private network.

18. The non-transitory machine-readable medium of claim 17 wherein concurrently decoding is performed with a parallel decoder bank comprising a number of decoders equal to or greater than a number of the plurality of video streams.

19. The non-transitory machine-readable medium of claim 17 further comprising program code to cause the machine to perform the operations of:
interpreting virtual camera (VCAM) configuration data associated with a plurality of VCAMs, the VCAM configuration data specifying configurations for virtual cameras configured by one of the video production team members,
wherein a first subset of the video streams are to be filtered out from further processing based, at least in part, on the VCAM configuration data, allowing further processing of a second subset of the video streams.

20. The non-transitory machine-readable medium of claim 19 further comprising program code to cause the machine to perform the operations of:
executing program code to present a graphical user interface (GUI) to the one or more video production team members, the GUI presenting a video production team member with a stream selection window comprising a plurality of video tiles or graphical representations corresponding to the second subset of the video streams, the GUI providing a selection graphic to visually differentiate video streams of the second subset which are selected from those which are not selected.

21. The non-transitory machine-readable medium of claim 20 wherein the GUI further comprises a virtual camera configuration window comprising a plurality of selectable camera graphic elements corresponding to the plurality of VCAMs, wherein a VCAM is to generate a video stream from a perspective indicated by a corresponding camera graphic element.

22. The non-transitory machine-readable medium of claim 21 wherein the virtual camera configuration window comprises a first mapping region to associate a first subset of the camera graphic elements with a corresponding plurality of player graphic elements representing players in a sporting event, wherein a first VCAM associated with a first camera graphic element is to generate a video stream from a perspective of a first player associated with an associated camera graphic element.

23. The non-transitory machine-readable medium of claim 22 wherein the virtual camera configuration window further comprises a second mapping region to associate a second subset of the camera graphic elements with locations on or around a graphical representation of a region of play for a sporting event, wherein a second VCAM associated with a second camera graphic element from the second subset is to generate a video stream from a perspective indicated in the second mapping region.

24. The non-transitory machine-readable medium of claim 17 further comprising program code to cause the machine to perform the operations of:
injecting metadata associated with a player or team into one or more of the subset of the plurality of video streams for live transmission over a public or private network, the metadata to be decoded and presented on client devices of one or more end users.

* * * * *